United States Patent
Enomoto et al.

(10) Patent No.: US 7,397,969 B2
(45) Date of Patent: Jul. 8, 2008

(54) RED EYE COMPENSATION METHOD, IMAGE PROCESSING APPARATUS AND METHOD FOR IMPLEMENTING THE RED EYE COMPENSATION METHOD, AS WELL AS PRINTING METHOD AND PRINTER

(75) Inventors: Jun Enomoto, Kanagawa (JP); Takayuki Iida, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 113 days.

(21) Appl. No.: 10/651,301

(22) Filed: Aug. 29, 2003

(65) Prior Publication Data
US 2004/0109614 A1    Jun. 10, 2004

(30) Foreign Application Priority Data
Aug. 30, 2002  (JP) ............... 2002-254532
Aug. 30, 2002  (JP) ............... 2002-254964
Sep. 19, 2002  (JP) ............... 2002-272687

(51) Int. Cl.
*G06K 9/40* (2006.01)

(52) U.S. Cl. ............ 382/275; 382/260; 382/274; 358/3.26; 358/3.27

(58) Field of Classification Search ......... 382/103, 382/117, 118, 167, 190, 282; 358/515, 518
See application file for complete search history.

(56) References Cited

U.S. PATENT DOCUMENTS

| | | | |
|---|---|---|---|
| 5,991,546 A * | 11/1999 | Chan et al. ............ 710/62 |
| 6,219,129 B1 | 4/2001 | Kinjo et al. |
| 6,292,574 B1 * | 9/2001 | Schildkraut et al. ...... 382/117 |
| 6,407,777 B1 * | 6/2002 | DeLuca ............... 348/576 |
| 6,445,819 B1 | 9/2002 | Kinjo |
| 6,522,418 B2 * | 2/2003 | Yokomizo et al. ....... 358/1.15 |
| 6,577,751 B2 | 6/2003 | Yamamoto |
| 6,728,401 B1 * | 4/2004 | Hardeberg ............ 382/167 |
| 6,885,766 B2 * | 4/2005 | Held et al. ........... 382/167 |
| 7,035,462 B2 * | 4/2006 | White et al. .......... 382/167 |

(Continued)

FOREIGN PATENT DOCUMENTS

JP    6-75305 A    3/1994

(Continued)

OTHER PUBLICATIONS

Japanese Office Action dated Mar. 6, 2007.

(Continued)

*Primary Examiner*—Yosef Kassa
(74) *Attorney, Agent, or Firm*—Sughrue Mion, PLLC

(57) ABSTRACT

The red eye compensation method and the image processing apparatus are used to read out image data for outputting or corresponding original image data from among previously stored image data, subject the image data to red eye compensation and regenerates the image data for outputting. In the image processing method, a verification screen is used to designate a red eye frame and display a result of red eye compensation for confirmation. The other red eye compensation method, the other image processing method, a printing method and a printer are used to judge whether there is a possibility that image quality deterioration such as red eye occurs based on photographing information prior to compensating for specified deterioration in image quality such as red eye.

15 Claims, 13 Drawing Sheets

U.S. PATENT DOCUMENTS 7,042,501 B1 * 5/2006 Matama .................. 348/222.1
7,119,923 B1 10/2006 Iwaki

FOREIGN PATENT DOCUMENTS

| | | |
|---|---|---|
| JP | 07-013274 | 1/1995 |
| JP | 11-282446 A | 10/1999 |
| JP | 11-341275 | 10/1999 |
| JP | 11-338062 | 12/1999 |
| JP | 11-355591 | 12/1999 |
| JP | 2000-076427 A | 3/2000 |
| JP | 2000-137788 A | 5/2000 |
| JP | 2000-148980 A | 5/2000 |
| JP | 2000-149018 A | 5/2000 |
| JP | 2000-350128 | 12/2000 |
| JP | 2001-103303 | 4/2001 |
| JP | 2002-171408 | 6/2002 |

OTHER PUBLICATIONS

Japanese Office Action dated Jun. 26, 2007.
Japanese Office Action dated May 29, 2007.

* cited by examiner

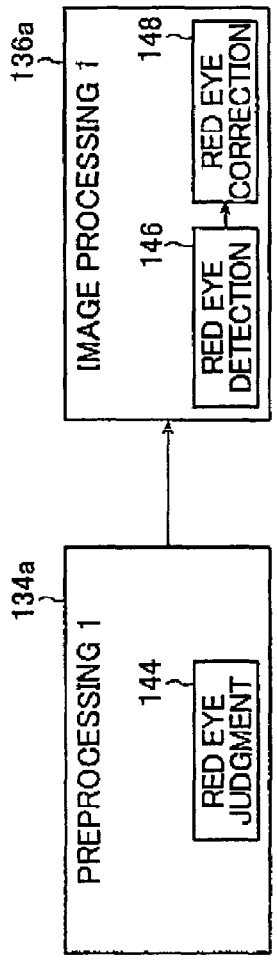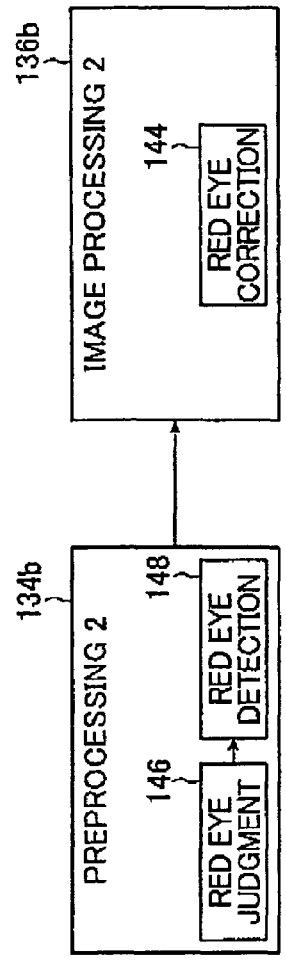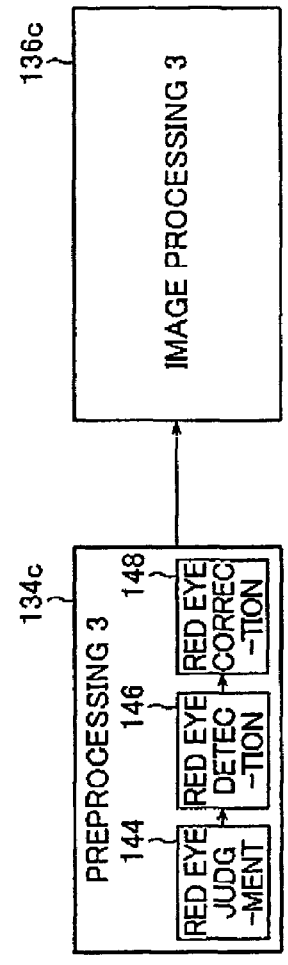

RED EYE COMPENSATION METHOD, IMAGE PROCESSING APPARATUS AND METHOD FOR IMPLEMENTING THE RED EYE COMPENSATION METHOD, AS WELL AS PRINTING METHOD AND PRINTER

BACKGROUND OF THE INVENTION

1. Field of the Invention

The present invention relates to a technical field of red eye compensation through image processing, and more specifically to a red eye compensation method with which it is possible to perform red eye correction with efficiency, a red eye compensation method with which it is possible to perform red eye compensation at the time of remaking or reprinting or the like with efficiency, an image processing apparatus for implementing the red eye compensation method, and an image processing method with which it is possible to perform red eye compensation processing in a process of printing with film processing.

The present invention also relates to a technical field of image quality deterioration correction such as red eye correction and aberration correction through image processing. In particular, the present invention relates to an image processing method in which image quality deterioration correction such as red eye correction is performed efficiently through preprocessing; a printing method for outputting a print subjected to image processing such as red eye correction; a printer which is adapted for implementing the printing method and has a preprocessing function; and a direct printer for directly outputting image data read out of a digital camera or its recording medium as a print without loading the data into a PC (personal computer).

2. Description of the Related Art

Heretofore, images photographed on photographic films, such as negative films and reversal films, (hereinafter simply referred to as "films") have been commonly printed on light-sensitive materials (photographic paper) through so-called direct exposure in which the film images are projected onto the light-sensitive materials to achieve exposure.

Also, in recent years, digital photoprinters have been developed and put into practical use. Each digital photoprinter outputs images recorded on a film as prints by photoelectrically capturing the images on the film, converting the captured images into digital signals, subjecting the digital signals to various kinds of image processing to generate image data for recording, and exposing a light-sensitive material using recording light modulated in accordance with the image data for recording.

The digital photoprinter basically includes: a scanner (image reading apparatus) that brings reading light into incident on a film and reads the light projecting the film, thereby photoelectrically capturing images recorded on the film; an image processing apparatus that analyzes digital image data generated by the image capturing by the scanner (image analysis) and performs image processing corresponding to a result of the analysis on the digital image data, thereby obtaining image data for outputting; a printer (image recording apparatus) that exposes a light-sensitive material by, for instance, performing light beam scan in accordance with the image data outputted from the image processing apparatus, thereby recording a latent image; and a processor (developing apparatus) that performs development processing on the light-sensitive material exposed by the printer so as to obtain (finished) prints in which the images are reproduced. Here, an input machine is formed by the scanner and the image processing apparatus, while an output machine (printer/processor) is formed by the printer and the processor.

The digital photoprinter obtains digital image data by photoelectrically capturing images photographed on a film and performs image processing and exposure of a light-sensitive material. Therefore, the digital photoprinter is capable of creating prints not only from images photographed on a film but also from images (image data) photographed with a digital camera or the like.

Also, image processing is performed through image data processing, so that it is possible not only to very favorably correct color and density but also to obtain a high-quality image by performing image processing, such as gradation correction and sharpness processing (sharpness enhancement processing), that has been basically impossible to attain with an ordinary direct exposure printer.

Further, the digital photoprinter is not limited to the outputting of image data as prints and it is also possible to record the image data on a recording medium, such as a CD-R, as image files.

By the way, the most important factor that determines the quality of an image, such as a portrait, that contains a human subject is how the human subject appears in a finished print. Therefore, a so-called red eye phenomenon, in which the eyes (pupils) of a photographed human subject are colored in red due to the influence of light emitted from an electronic flash at the time of photographing, constitutes a serious problem.

In the direct exposure photoprinter, in order to compensate red eye, it is required to retouch a film using a color material or the like, and this film retouching is performed by a skilled operator at much expense in time and effort. Therefore, it is substantially impossible to perform the red eye compensation at the time of printing with film processing or the like.

In contrast to this, with the digital photoprinter, it is possible to perform the red eye compensation through image analysis and image data processing, meaning that the above film retouching is not required at all. For instance, each pupil colored in red is detected through cutting-out and position designation by an operator, automatic extraction utilizing image analysis, and the like. Then, the detected pupil (its image data) is subjected to color transformation in order to correct the red eye. In this manners red eye compensation processing is performed.

Such red eye compensation is time-consuming processing because a relatively large amount of calculation needs to be performed. Therefore, under the present circumstances, it is technically difficult to perform full-automatic red eye compensation with reliability on the image in every frame as a predetermined processing target. Consequently, it is required to use some kind of function for performing selection, confirmation, addition, and correction.

Thus, it is usual in a print shop using a digital photoprinter provided with a red eye compensation function that a print with red eye phenomenon which may possibly be found out at the time of inspection or the like in a process of printing with film processing is regarded as an NG print and remaking of the relevant frame (fresh printing with respect to the NG print) is performed, thereby providing a customer with a print having no red eye problem. There is another case where, when a customer requests reprinting (additional printing), he/she also requests red eye compensation.

When red eye compensation is performed in a digital photoprinter at the time of such remaking or reprinting, it is required to photoelectrically re-capture the film with the aforementioned scanner and to perform completely the same processing as at the time of printing with film processing before performing the red eye compensation processing.

That is, in the digital photoprinter, when remaking or reprinting is performed in order to perform red eye compensation processing, it is required to perform completely the same operations as in the case of ordinary print outputting or the like on frames whose prints have been outputted once. This lowers operability and efficiency and therefore constitutes a factor of reduction in productivity.

Therefore, as described above, even with the digital photoprinter having the red eye compensation function, it is difficult to carry out red eye compensation processing at the time of so-called printing with film processing or the like from the viewpoint of productivity, cost, and the like. Consequently, under the present circumstances, red eye compensation processing is mainly carried out only in a remaking process or a reprinting process.

However, it may also be possible to perform full-automatic red eye compensation in which operator's manipulations are not required.

Incidentally, as a red eye compensation method used in the digital photoprinter to make correction to the red eye, there is known a method with which the face of a human subject is extracted from an image through, for instance, edge detection, hue detection, or the like, each pupil colored in red is detected from the extracted face, and the detected pupil (its image data) is subjected to color transformation or the like, thereby performing the red eye correction.

FIG. 13 shows an exemplary flowchart of the conventional full-automatic method of red eye compensation processing to be implemented in a digital photoprinter as described above, The conventional full-automatic method of red eye compensation processing as shown in FIG. 13 starts with the number N of processed frames equal to 1. At Step 200 of the method, image data on an image as the processing target is read out of an image data source such as a digital camera, a recording medium, a scanner, and so forth.

At Step 202, the image data on the image as the processing target is analyzed to extract the face of a human subject from the image through, for instance, edge detection, hue detection, or the like and then detect the pupil that is colored in red, as described above. If no red eye phenomenon is detected, the method is skipped to Step 208.

If the red eye is detected at Step 204, the color transformation and other processing are performed on the pupil colored in red subsequently at Step 206 so as to make correction to the red eye.

In the case of the image not only subjected to red eye correction at Step 206 but involving no red eye phenomenon to be detected at Step 204, usual image processing such as color density correction and image structure processing (including sharpness processing) is performed on the image at Step 208.

Based on the output image data obtained by performing the above image processing, the image is reproduced and outputted as a print at Step 210.

Subsequently at Step 212, it is determined whether or not the number N of processed frames has attained the number of processed frames intended for one case (one processing unit), $N_0$, which is equal to 50, for instance ($N \geq N_0 = 50$). If the number N of processed frames is smaller than $N_0$ (50), it is incremented by 1 (N=N+1) at Step 214 before the method goes back to the image reading process at Step 200. Red eye compensation (detection and correction), image processing, and print outputting are repeated until the number N becomes equal to $N_0$ (50), that is to say, terminated when N has attained $N_0$ (50).

Generally, red eye detection requires about 1.5 seconds per frame and red eye correction about 0.3 seconds per frame (as measured on the PC with a Pentium® 4 CPU 2 GHz on board) even when the red eye compensation processing is carried out in a large scaled digital photoprinter dedicated to photographic printing. When the full-automatic method of red eye compensation processing as above is used for outputting all the images (in the frames intended for one case, the number $N_0$ of which is equal to 50, for instance) as prints, the red eye detection process requires 50 frames×1.5 seconds=75 seconds because the red eye detection is performed on all the images (in the 50 frames). Assuming that the red eye phenomenon has been found out in 9 out of 50 frames in the red eye detection process, it takes 77.7 seconds in total to carry out red eye compensation processing in accordance with the conventional flowchart as shown in FIG. 13 because the red eye correction time of 9 frames×0.3 seconds=2.7 seconds is added to the red eye detection time of 75 seconds.

In view of the fact that the processing time is increased by up to 77.7 seconds for just 50 frame images, it is not negligible upon outputting a large number of images as prints that an additional processing time of 1.8 seconds is required for each frame image. It can not be expected to employ such a high-performance CPU as above for printers, especially those of consumer use, because there is a severe cost reduction race with respect to printers, so that a longer processing time will practically be required.

As described above, it is possible indeed to automatically perform red eye compensation processing in digital photoprinters. In that case, however, the red eye compensation processing, as comprising the red eye detection process in which face extraction and red eye detection are performed and the red eye correction process in which correction is made to the red eye, requires a large amount of calculation. In addition, it is difficult to perform the above processes using image data for condition setting and verification image creation (so-called prescanned data) which is small in data amount, and it is required to perform the processes using image data for outputting (so-called fine scanned data) which is large in data amount.

Further, the number of human subjects in one frame (one image) is not limited to one and, when multiple human subjects exist in the same frame, it is required to perform the red eye detection and the red eye correction on every human subject.

When full-automatic red eye compensation processing is performed in the digital photoprinter, the above processes are performed on all the frames, the number of which is 24, for instance. In general, however, it is a rare case that the red eye problem occurs in every frame. Therefore, in the full-automatic red eye compensation processing, the red eye detection process is unnecessarily performed on frames having no red eye problem, so that it takes a very long time to carry out the processing (meaning that a long time is wasted). In other words, the full-automatic red eye compensation processing raises a problem of reduction in processing performance, namely productivity, of the digital photoprinter, although it saves the trouble of an operator.

There may be another problem of erroneous detection where frames having no red eye problem are mistaken as having such problem.

For this reason, it is general at present that the red eye compensation processing is performed not at the time of printing with film processing but at the time of remaking or reprinting only on the relevant frames, especially those designated or selected by a customer upon a possible request for red eye compensation. In that case, the red eye compensation processing may be carried out manually in accordance with the result of visual verification by an operator or, alternatively, in a semi-automatic manner that, for instance, the frames of interest are manually designated and the red eye detection and correction processes are automatically performed on the designated frames.

It was proposed to record various kinds of photographing information concerning photographed images, which are obtained by photographing a subject with a digital camera, in a recording medium (memory card) of the camera along with the image data on the photographed images and utilize the information at the time of print outputting. Information to be recorded along with image data at the time of photographing has been standardized as Exif (standards). Particularly, contents to be recorded are defined in detail by Exif 2.2 aiming at their plenitude and commonality so that the quality of image printing can be readily improved by utilizing the information recorded at the time of photographing.

Thus, it is possible under Exif 2.2 to carry out optimal printing on the basis of various kinds of photographing information. To be more specific: In the case of a digital still camera (DSC), various kinds of photographing information set by a photographer such as "information about photographing condition" and "information about photographed scene" are recorded along with "image data" in the camera as an Exif tag. In a printer, on the other hand, such photographing information is accurately read with certain application software so as to perform optimal printing. Thus, an image in line with the intention of the photographer can be reproduced by obtaining various kinds of photographing information, which heretofore could not but be estimated, directly from the digital camera.

The photographing condition set on the DSC is accurately transmitted to the printer and processing is carried out optimally. For instance, if the mode of exposure was set to "automatic" upon photographing and the photographed image is of underexposure or overexposure due to something not intended by the user, density correction is so performed on the image that the exposure is optimized. In the case of manual mode, no correction is made in the printer because it is indicated that the exposure of interest was set by the photographer with some intention or other. Similarly, if the white balance was set to "automatic", processing is carried out so as to remove color fog, if any. If the photographed image has a wash-out as a result of automatic light emission from an electronic flash, such processing as for the reduction in brightness of too bright areas is performed on the image so as to optimize its density.

In the printer, the information about the scene photographed with the DSC and recorded therein is utilized for printing so as to obtain a photograph suited to the photographed scene. For instance, if a photographing mode suited to the subject was selected upon photographing (from among such modes as "standard", "landscape", "person" and "night view"), the information about the mode can be exploited for the printing more suitable to the photographed scene. In the case of "landscape" mode being selected, the contrast or saturation is made higher, or color reproduction processing which is preferred by people is performed using stored colors such as blue and green. In the case of "night view" mode, bright areas are intensified, with dark areas being maintained as such. A night view is regenerated more vividly by making correction to color fog or contrast or intensifying the saturation.

When Exif information is utilized to optimize conditions for image processing as described above, printers are required to have an extremely high image processing ability in order to support Exif 2.2. For this reason, Exif 2.2-supporting printers are limited to printers each equipped with an image processing apparatus (image processor) having a high image processing speed or image processing ability, for instance, a PC (personal computer) or one or more CPUs (MPUs), especially to large-scaled digital photoprinters. Even in the case of such Exif 2.2-supporting printers with a high image processing speed or image processing ability, however, few of them can perform red eye compensation processing and, in addition, the red eye compensation processing is troublesome and time-consuming and consequently decreases productivity even in large-scaled digital photoprinters. In the present situation, therefore, the red eye compensation processing is performed on a special occasion, for instance, at the time of remaking or reprinting, in a manual or semi-automatic manner.

In direct printers which are commercially available, image data on photographed images are directly read out of a digital camera without temporary loading into a PC (personal computer) and prints of photographic quality are outputted as hardcopy images.

FIG. 14 shows a conventional direct printer. A direct printer 150 as shown comprises an image data acquiring section 152, an image processing section 154, a print output processing section 156, a printer controlling section 158 and a recording section 160.

In the direct printer 150 as shown in FIG. 14, image data is initially read out of a memory card inserted into a card slot 152$a$ by a card reader (card drive) provided in the image data acquiring section 152 or, alternatively, read out of a memory card loaded onto a digital camera by connecting an external input terminal 152$b$ with the digital camera via a cable and controlling the camera with an external input processing unit of the image data acquiring section 152.

The read image data is subjected to usual image processing such as color density correction processing and processing for correction to sharpness and other image structure in the image processing section 154.

Then, in the print output processing section 156, the data is subjected to the processing for conversion into image data to be outputted as a print. Using the converted data, the recording section 160 provided with an ink-jet recording head and so forth is controlled by the printer controlling section 158 to record a reproduced image on such paper as ink-jet recording paper, a hardcopy image as a print being thus outputted.

Conventional direct printers as above have only a limited image processing ability or speed and no such printer can perform the red eye compensation processing that is troublesome and time-consuming. Some direct printers have been commercialized indeed as an Exif 2.2-supporting printer which is required to have a high image processing ability or speed as described before and examples of them include BJ 895 PD with twin CPUs on board (Canon Inc.). At present, however, such direct printers are not equipped with any software or hardware for red eye compensation processing which is required to have a higher image processing ability or speed even though the printers have an image processing ability or speed allowing them to support Exif 2.2.

The respects as described above in connection with the red eye compensation processing are also true in the case of correction to image quality deterioration due to golden eye phenomenon and other defects with respect to the eyes of a subject, or even in the case of aberration correction, for instance, correction to image quality deterioration caused by an objective lens, such as distortion, lateral chromatic aberration, marginal luminosity deterioration, and defocus.

SUMMARY OF THE INVENTION

In order to solve the aforementioned problems of the conventional technique, the present invention has a first object of providing a red eye compensation method and an image processing apparatus for implementing the red eye compensation method, with which it is possible to perform red eye compensation processing at the time of remaking or reprinting with favorable operability and efficiency by eliminating the necessity to perform capturing of images from a film and the like again.

In order to solve the aforementioned problems of the conventional technique, the present invention has a second object of providing an image processing method with which it is possible to perform print creation including red eye compensation processing with favorable operability and productivity in a process of so-called printing with film processing that is the most regular process performed in a print shop (such as a photo lab) in which a digital photoprinter is used.

In order to solve the aforementioned problems of the conventional technique, the present invention has a third object of providing a red eye compensation method, with which it is possible to perform red eye compensation processing with efficiency through image data processing and, when full-automatic red eye compensation processing is performed in a digital photoprinter, for instance, it is possible to reduce the processing time to improve productivity, and further possible to improve the accuracy of red eye compensation even if the total processing time assigned to one frame is increased, so that the productivity is not impaired as a whole.

In order to solve the aforementioned problems of the conventional technique, the present invention has a fourth object of providing an image processing method, in which correction to a specified image quality deterioration such as defects with respect to the eyes of a subject including red eye and golden eye phenomena, and aberration including distortion, lateral chromatic aberration, marginal luminosity deterioration, and defocus can be made with efficiency and, in particular, without reduction in productivity even if a PC or CPU having a high image processing ability or speed is not provided, by using photographing information added to image data, for instance, utilizing Exif information generally utilized to optimize conditions for image processing as tag information with a motive departing from the idea of Exif 2.2.

It is a fifth object of the present invention to provide a printing method which utilizes such an image processing method as above making it possible to achieve the above fourth object.

Finally, it is a sixth object of the present invention to provide a printer having a preprocessing function, in which such a printing method as above making it possible to achieve the above fifth object is performed, particularly a direct printer which can directly output image data read out of a digital camera or its recording medium without loading the data into a PC (personal computer).

In order to attain the first object described above, a first embodiment of a first aspect according to the present invention provides a red eye compensation method comprising storing, when original image data is subjected to image processing and image data for outputting is generated and outputted, at least one of the original image data and the image data for outputting in storage means, reading out, when an instruction was issued for red eye compensation of an image of previously outputted image data for outputting, one of the image data for outputting and corresponding original image data from the storage means, and performing the red eye compensation on the read-out image data to regenerate the image data for outputting.

And, a second embodiment of the first aspect according to the present invention provides an image processing apparatus that performs image processing on supplied original image data and generates and outputs image data for outputting, comprising storage means for storing at least one of previously outputted image data for outputting and corresponding original image data in relation to identification information of an image of the previously outputted image data for outputting, and red eye compensation means for reading out from the storage means, when an instruction was issued for red eye compensation of the image of the previously outputted image data for outputting, the image data for outputting or the original image data carried by the image to which the instruction for the red eye compensation was issued, using the identification information of the image, and performing the red eye compensation.

Preferably, a red eye compensation mode is prepared as a processing mode, and when the red eye compensation mode is set, the red eye compensation means automatically performs the red eye compensation on one of the image data for outputting and the original image data by regarding an instruction for reading out one of the image data for outputting and the original image data using the identification information as the instruction for the red eye compensation of the image.

And, it is preferable that the image processing apparatus comprises display means for displaying an image after the red eye compensation by the red eye compensation means has been performed, alone or together with an image before the red eye compensation is performed.

In order to attain the second object described above, a first embodiment of a second aspect according to the present invention provides an image processing method for performing image processing on image data to generate output image data, comprising displaying on a display, a verification screen in which verification images corresponding to the image data are displayed and which doubles as means for designating a red eye frame for which red eye compensation should be performed, from among the displayed verification images, sequentially subjecting image data of each frame which has been subjected to verification to image processing for obtaining the output image data, in response to an instruction for completing the verification of a predetermined number of frames using the verification screen and, further performing the red eye compensation on the red eye frame, and displaying on the display, an image with which a result of the red eye compensation is confirmed, at the point in time when the red eye compensation of the red eye frame is finished and performing the image processing on a subsequent frame in response to an instruction for completing confirmation of the red eye compensation.

In addition, a second embodiment of the second aspect according to the present invention provides an image processing method for performing image processing on image data to generate output image data, comprising displaying on a display, a verification screen in which verification images corresponding to the image data are displayed and which doubles as means for designating red eye frames for which red eye compensation should be performed, from among the displayed verification images, sequentially subjecting image data of each frame which has been subjected to verification to image processing for obtaining the output image data, in response to an instruction for completing the verification of a predetermined number of frames using the verification screen and, further performing the red eye compensation on the red eye frames, and displaying on the display, images with which results of the red eye compensation for the individual red eye frames are confirmed, after the red eye compensation of all the red eye frames has been finished.

Preferably, photoelectrical image capturing is performed twice through prescan and fine scan on each frame of a photographic film to obtain the output image data, with the prescan being successively performed on each frame for one case and the fine scan being performed in units of a predetermined number of frames each time the instruction for completing the verification is issued, and the verification images are created using image data obtained as a result of the prescan, and the image processing for obtaining the output image data and the red eye compensation are performed using image data obtained as a result of the fine scan.

Or, preferably, photoelectrical image capturing is performed once for each frame of a photographic film in order to obtain the output image data, and the verification images are created using image data where images obtained by the image capturing are reduced, and the image processing for obtaining the output image data and the red eye compensation are performed using image data obtained by the image capturing.

Preferably, auxiliary information for use in judging whether or not red eye phenomenon occurs in each frame is displayed on the verification screen.

And, preferably, the red eye compensation includes detecting red eye phenomenon from a face which has been extracted in an image and correcting the red eye phenomenon, and face extraction is performed with image data used to create the verification images and the red eye detection is performed with image data used to obtain the output image data.

In order to attain the third object described above, a first embodiment of a third aspect according to the present invention provides a red eye compensation method comprising adding photographing information to an optically photographed image, judging using the photographing information whether there is a possibility that red eye phenomenon occurs, and subjecting the image to red eye compensation only when there is a possibility that the red eye phenomenon occurs.

Further, in order to attain the fourth object described above, a second embodiment of the third aspect according to the present invention provides an image processing method comprising the steps of reading out image data of an optically photographed image and photographing information added to the image data, performing preprocessing which includes at least processing for judging whether there is a possibility that specified image quality deterioration occurs, using the photographing information, detecting the image quality deterioration in the image only when the image has a possibility that the image quality deterioration occurs, and correcting the specified image quality deterioration that was detected in the image.

In the image processing method according to the second embodiment of the third aspect, the image data of the image is preferably subjected to necessary image processing for print output to obtain image data for outputting, when the image was compensated for the specified image quality deterioration, when the image was judged to have no possibility that the image quality deterioration occurred, and when the image quality deterioration was not detected in the image.

In order to attain the fifth object described above, a third embodiment of the third aspect according to the present invention provides a printing method comprising the step of outputting an image reproduced from the image data obtained by the image processing method of the second embodiment described above for outputting as a print.

And, in order to attain the sixth object described above, a fourth embodiment of the third aspect according to the present invention provides a printer having a preprocessing function, comprising image acquisition means for reading out image data of an optically photographed image and photographing information added to the image data, preprocessing means for performing preprocessing which includes at least processing for judging whether there is a possibility that specified image quality deterioration occurs, using the photographing information of the image acquired by the image acquisition means, image processing means for subjecting the image data of the image acquired by the image acquisition means to at least necessary image processing for print output to obtain image data for outputting, and print output processing means for outputting a reproduced image from the image data for outputting as a print, wherein, when the image was judged to have a possibility that the image quality deterioration occurred, the preprocessing means and the image processing means perform processing for detecting the image quality deterioration in the image and correcting the specified image quality deterioration that has been detected in the image.

Preferably, the preprocessing means performs, as preprocessing, only processing for judging whether there is a possibility that the specified image quality deterioration occurs, and only when the image was judged to have a possibility that the image quality deterioration occurred, the image processing means performs processing for detecting the image quality deterioration in the image and correcting the specified image quality deterioration that has been detected in the image, and when the image was compensated for the specified image quality deterioration, when the image was judged to have no possibility that the image quality deterioration occurred, and when the image quality deterioration was not detected in the image, the image data of the image is subjected to the necessary image processing.

Or, preferably, the preprocessing means performs, as preprocessing, processing for judging whether there is a possibility that the specified image quality deterioration occurs, and processing for detecting the image quality deterioration only when the image was judged to have a possibility that the image quality deterioration occurred, and the image processing means performs the processing for correcting the specified image quality deterioration that has been detected, and subjects the image data of the image to the necessary image processing when the image was compensated for the specified image quality deterioration, when the image was judged to have no possibility that the image quality deterioration occurred, and when the image quality deterioration was not detected in the image.

Or, preferably, the preprocessing means performs, as preprocessing, processing for judging whether there is a possibility that the specified image quality deterioration occurs, processing for detecting the image quality deterioration of the image when the image was judged to have a possibility that the image quality deterioration occurred, and processing for correcting the specified image quality deterioration that has been detected, and the image processing means subjects the image data of the image only to the necessary image processing when the image was compensated for the specified image quality deterioration, when the image was judged to have no possibility that the image quality deterioration occurred, and when the image quality deterioration was not detected in the image.

In particular, the printer according to the fourth embodiment of the third aspect is preferably a digital printer in which the image acquisition means directly reads out the image data of the image and the photographing information from a recording medium onto which the image data of the image and the photographing information are recorded, or from a digital camera with which the image was photographed, and the print output processing means outputs as a print a hard copy image reproduced from the image data that was read out by the image acquisition means and processed by the preprocessing means and the image processing means.

Further, in each of the first to fourth embodiments of the third aspect described above, preferably, the photographing information is at least one of flash information, an Ev value, a shutter speed, a stop value, a photographing mode, a camera type, lens information, a distance between a subject and a camera, a photographing time and other Exif information.

Moreover, in each of the second to fourth embodiments of the third aspect described above, preferably, the photographing information is added by at least one of an optical means, a magnetic means, and an electrical means at the time of photographing.

BRIEF DESCRIPTION OF THE DRAWINGS

Preferred embodiments of the present invention will be described in detail based on the following figures, wherein:

FIGS. 12A, 12B and 12C are each a block diagram showing a layout example of a preprocessing section and an image processing section in the direct printer shown in FIG. 11;

DETAILED DESCRIPTION OF THE PREFERRED EMBODIMENTS

A red eye compensation method and an image processing apparatus that implements the red eye compensation method, as well as an image processing method, a printing method and a printer according to the present invention will now be described in detail based on the preferred examples illustrated in the accompanying drawings.

First Aspect

First, a red eye compensation method according to a first embodiment of a first aspect of the present invention and an image processing apparatus according to a second embodiment of a first aspect of the present invention that implements the red eye compensation method will be described with reference to FIGS. 1 to 4.

Figure 1:
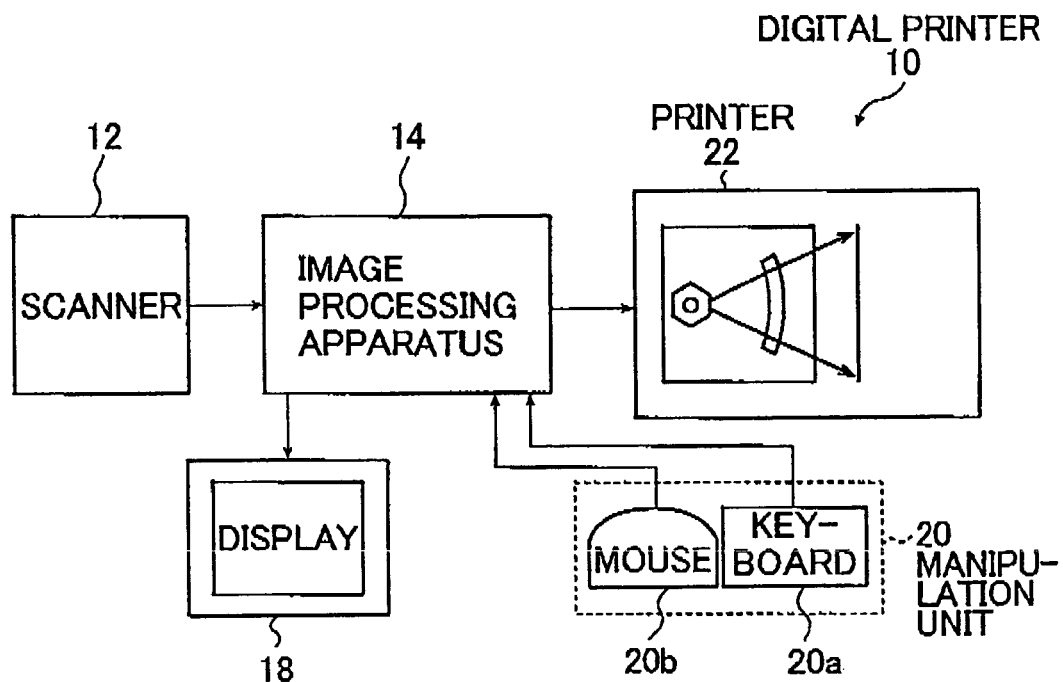
FIG. 1 is a block diagram of an example of a digital photoprinter provided with an example of the image processing apparatus of the present invention that implements a red eye compensation method of the present invention.

FIG. 1 is a block diagram of an example of a digital photoprinter utilizing the red eye compensation method and the image processing apparatus that implements the red eye compensation method according to the first aspect of the present invention.

A digital photoprinter (hereinafter referred to as a "photoprinter") 10 shown in FIG. 1 photoelectrically captures images photographed on a (photographic) film F or obtains image data (image files) of images photographed with a digital camera or the like, and outputs the images as (photographic) prints. The digital photoprinter 10 basically includes a scanner 12, an image processing apparatus 14 according to the present invention, and a printer 22.

The scanner 12 is an apparatus that photoelectrically captures an image photographed in each frame of a film F. As shown in a conceptual diagram of FIG. 2, the scanner 12 includes a light source 24, a driver 26, a diffuser box 28, a carrier 30, an imaging lens unit 32, a reading unit 34, an amplifier 36, and an A/D (analog/digital) converter 38.

In the scanner 12 of the illustrated example, the light source 24 uses LEDs (Light Emitting Diodes) and is produced by arranging three kinds of LEDs that each emit reading light in one of R (red), G (green), and B (blue). The light source 24 having this construction is driven by the driver 26 and sequentially emits the reading light in R, G, and B.

The diffuser box 28 is provided to diffuse the reading light so that it becomes uniform on the film F across the plane of the film F. The diffuser box 28 includes an internal mirror square pole, a diffuser plate that blocks one face of the square pole, and the like, for instance.

The carrier 30 intermittently transports the film F, thereby sequentially transports/sets each frame (each image) photographed on the film F to/at a predetermined reading position. Various carriers are prepared in order to cope with various films F, such as 135-size films and APS (IX240) films, having different sizes and the like, and are detachably attached to the main body of the scanner 12.

In the illustrated example, the carrier 30 basically includes transport roller pairs 40a and 40b, a mask 42 that regulates a reading area of each frame at the predetermined reading position, and a mask 44 that also functions as a member for pressing the film F.

The transport roller pairs 40a and 40b are each a known transport roller pair for (photographic) films and are arranged so that the predetermined reading position is sandwiched therebetween in a transporting direction of the film F. The scanner 12 of the illustrated example performs image capturing through areal exposure, so that the transport roller pairs 40a and 40b sequentially transports frames photographed on the film F to the reading position frame by frame by intermittently transporting the film F in a lengthwise direction.

Light having passed through a frame positioned at the reading position (projection light bearing an image) is brought into incident on the imaging lens unit 32, which then focuses the projection light from the film F on the reading unit 34 (light-receiving surface of an image sensor).

The reading unit 34 photoelectrically captures the images photographed on the film F using an area CCD sensor by reading the entire area of each frame regulated by the mask 42 of the carrier 30 (image reading through areal exposure).

An image signal from the reading unit 34 is amplified by the amplifier 36, is converted into a digital image signal by the A/D converter 38, and is outputted to the image processing apparatus 14.

In this scanner 12, in order to capture images from the film F, first, the film F is transported by the carrier 30 in order to set a frame to be captured first (usually, the first frame or the last frame) at the reading position.

Next, for instance, the R LED of the light source 24 is driven under the control by the driver 26, thereby emitting a light. The R light is diffused by the diffuser box 28 so that the light quantity of the R light becomes uniform across the plane of the film F, and is brought into incident on the frame set at the reading position. The incident light passes through the frame and becomes projection light bearing an image photographed in the frame. This projection light is imaged by the imaging lens unit 32 on the reading unit 34, which then photoelectrically captures an R image of this frame.

Following this, in the same manner, the G LED and the B LED of the light source 24 are sequentially driven to emit light and a G image and a B image of the frame are captured.

When the capturing of one frame is finished, the film F is transported by the carrier 30 again and, when a frame to be captured next is set at the reading position, the transporting of the film F is suspended. Then, the same capturing operation as above is performed. By repeating these operations, every frame of the film F is captured.

Here, in the photoprinter 10 of the illustrated example, the image in each frame is captured by two scans that are prescan and fine scan. The prescan refers to image capturing performed at a low resolution prior to the fine scan in order to determine reading conditions for the fine scan and image processing conditions to be used in the image processing apparatus 14 (such as an image processing unit 62). On the other hand, the fine-scan refers to image capturing performed at a high resolution in order to output prints or the like.

In the illustrated example, the prescan and the fine scan are performed for each frame. Therefore, after the image in one frame is captured twice, the carrier 30 further transports the film F and sets a frame to be captured next at the reading position. Then, the image in this frame is captured twice in the same manner.

It should be noted here that in the photoprinter 10 carrying out the present invention, the scanner that supplies image data of the film F to the image processing apparatus 14 is not limited to the illustrated example, and it is possible to use any other known scanners.

Accordingly, it is possible to use a scanner in which a white light source is combined with filters in the three primary colors and reading light in the three primary colors is brought into incident on the film in place of the LED light source for three primary colors of the illustrated example. Also, aside from the scanner that performs reading trough areal projection (exposure) using an area CCD sensor, there may be used a scanner that photoelectrically captures the film F through slit scan using a line CCD sensor.

The digital image signal generated by the scanner 12 in the manner described above is outputted to the image processing apparatus 14.

The image processing apparatus 14 obtains image data for outputting by performing predetermined image processing on the image signal sent from the scanner 12 or the image data (image files) of images photographed with a digital camera or the like.

Figure 3:
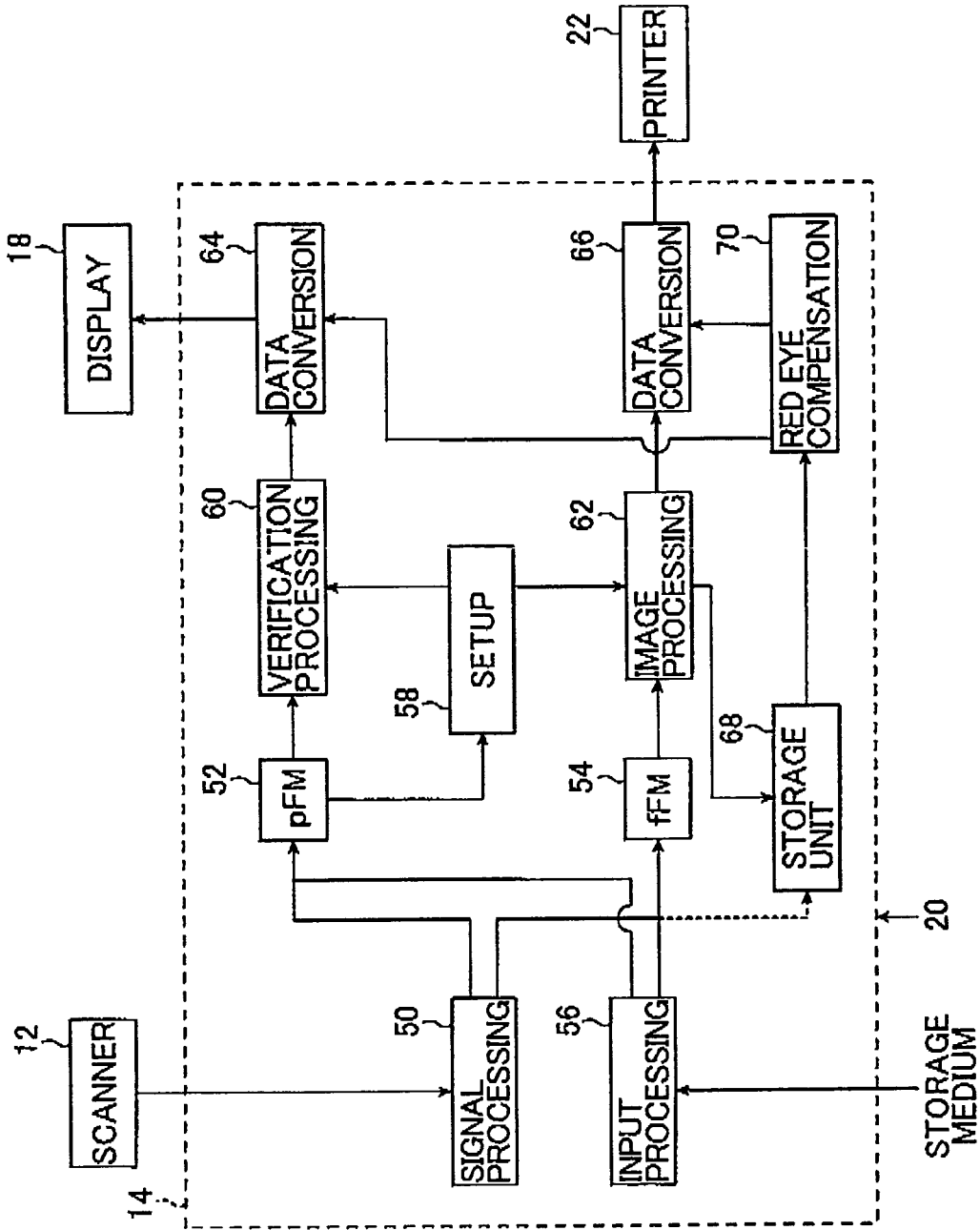
FIG. 3 is a block diagram of an example of the image processing apparatus of the digital photoprinter shown in FIG. 1.

As shown in FIG. 3, the image processing apparatus 14 basically includes a signal processing unit 50, a prescan (frame) memory 52, a fine scan (frame) memory 54, an input processing unit 56, a setup unit 58, a verification processing unit 60, an image processing unit 62, data conversion units 64 and 66, a storage unit 68, and a red eye compensation unit 70.

Also, as shown in FIG. 1, connected to the image processing apparatus 14 are a monitor 18 for displaying verification images and the like and a manipulation system 20 (including a keyboard 20a and a mouse 20b) for inputting a reading command to thereby designate a frame (image data) to be subjected to red eye compensation (reading command) to be described later, inputting various commands, and performing other manipulations.

The image signal sent from the scanner 12 is supplied to the signal processing unit 50.

The signal processing unit 50 performs predetermined signal correction, such as dark correction, DC offset correction, and shading correction, on the supplied image signal. Then, the signal processing unit 50 subjects a resultant image signal to Log conversion to generate image (density) data using a lookup table (hereinafter referred to as the "LUT") or the like.

Here, the signal processing unit 50 sends processed image data obtained by prescan (hereinafter referred to as the "prescanned data") to the prescan memory 52 (hereinafter referred to as the "pFM 52") and stores the prescanned data in the pFM 52. On the other hand, the signal processing unit 50 sends processed image data obtained by the fine scan (hereinafter referred to as the "fine scanned data") to the fine scan memory 54 (hereinafter referred to as the "fFM 54") and stores the fine scanned data in the fFM 54.

As described above, with the photoprinter 10, it is possible to perform print creation and the Like also from image data of images photographed with a digital camera or the like.

The image data of images photographed with a digital camera is usually recorded in a recording medium such as a SmartMedia™ card or a CompactFlash™ card. When print creation or the like from the image data recorded in the medium is performed using the photoprinter 10, the recording medium is read by a reading unit (not shown) connected to the photoprinter 10 and the image data (image files) is sent to the input processing unit 56.

Also, in the photoprinter 10, the image data may be directly sent to the input processing unit 56 from the digital camera or a communication unit such as the Internet.

The input processing unit 56 holds the supplied image data, converts the held image data into image data suited for outputting by the photoprinter 10, and stores the resultant image data in the fFM 54 as fine scanned data. The input processing unit 56 also generates prescanned data by thinning out the fine scanned data and stores the prescanned data in the pFM 52.

The setup unit 58 reads the prescanned data stored in the pFM 52, determines reading conditions for fine scan, and sends the determined reading conditions to the scanner 12. The setup unit 58 also performs image analysis using the prescanned data and determines image processing conditions to be used in the verification processing unit 60 and the image processing unit 62.

It should be noted here that a method of setting the image processing conditions and a method of performing image processing may be selected from among various known methods. Also, when an operator retouched an image at the time of verification, the setup unit 58 changes the image processing conditions in the verification processing unit 60 and the image processing unit 62 in accordance with the image amendment.

The verification processing unit 60 reads the prescanned data from the pFM 52, performs predetermined image processing on the read data to generate image data (hereinafter also referred to as the "verification image data") of verification images (finishing predictive images (simulated images)), and sends the verification image data to the data conversion unit 64.

The image processing performed on the prescanned data in the verification processing unit 60 corresponds to creation of verification images and is similar to image processing performed in the image processing unit 62 to be described later. Also, the image processing conditions used in this unit 60 are basically the same as those in the image processing unit 62.

On receiving the prescanned data processed in the verification processing unit 60, the data conversion unit 64 converts this data using a three-dimensional (3D)-LUT or the like to generate image data suited for image displaying on the display 18, and displays the resultant image data on the display as the verification images.

Also, when a red eye compensation mode to be described later is set, the data conversion unit 64 converts image data supplied from the red eye compensation unit 70 and displays an image after red eye compensation processing and, optically, further an image before the red eye compensation processing on the display 18.

On the other hand, the image processing unit 62 reads the fine scanned data from the fFM 54, performs image processing on the read data, and sends resultant data to the data conversion unit 66 and the storage unit 68 as image data for outputting (hereinafter referred to as the "output image data") suited for outputting as images such as print images.

The image processing performed in the image processing unit 62 is not specifically limited and examples thereof include electronic scaling processing (enlargement/reduction processing), gradation conversion, color/density correction, sharpness processing (sharpening processing), dodging processing (processing for compressing the dynamic range of image density), and the like.

It should be noted here that in the present invention, red eye compensation processing for compensating red eyes may be performed in the image processing unit 62 as the image processing at the time of printing with film processing or the like. Even in this case, it is sufficient that the red eye compensation processing is performed using the same method as that to be described later.

The data conversion unit 66 converts the output image data supplied from the image processing unit 62 using the 3D-LUT or the like into image data suited for image recording that is performed by the printer 22 (exposure of a light-sensitive material (photographic paper)).

It should be noted here that in the image processing apparatus 14 (photoprinter 10) according to the present invention, the output destination of the image data is not limited to the printer 22.

For instance, a unit that converts the output image data processed in the image processing unit 62 into image files in a JPEG format or the like may be provided in addition to the data conversion unit 66. In this case, the image data converted by this unit is outputted to a unit that records the image data on a recording medium such as a CD-R. Then, the recording medium, on which image files have been recorded, is provided to a customer.

The storage unit 68 is a portion for storing the output image data processed by the image processing unit 62, with this output image data being associated with identification information.

As the storage unit 68, it is possible to use various known storage units so long as they have sufficient capacities. Also, the storage unit 68 is provided in the image processing apparatus 14 in the illustrate example, although an external server or the like that is connected to the image processing apparatus 14 may be used instead.

The identification information is not specifically limited and it is possible to use various kinds of information so long as the output image data (corresponding frames (images)) can be associated with images (prints, in usual cases) outputted using this output image data in a one-to-one correspondence. Also, information supplied from the scanner 12, information automatically generated, and the like may be obtained and associated with each other using a known means.

For instance, the identification information includes at least one of the serial numbers of prints, the frame numbers of the prints, the ID number (hereinafter referred to as the "film ID") of the film F from which the image data has been captured, the dates and times at which the prints were outputted, a customer ID, a photographing date and time, print order information, and the like.

A time period, during which the output image data of each frame is stored in the storage unit 68, is not specifically limited and may be set as appropriate with reference to the kind of processing (remaking or reprinting, for instance) to be mainly performed in order to carry out red eye compensation to be described later.

When the red eye compensation mainly corresponds to remaking (fresh printing of NG prints found as a result of inspection or the like), for instance, the storage time period may be set at around one to seven days. In contrast to this, when the red eye compensation mainly corresponds to reprinting (request of additional fresh printing or the like from a customer), the storage time period may be set at around one month.

It should be noted here that in the image processing apparatus 14 of the illustrated example, the storage unit 68 stores the output image data processed in the image processing unit 62, although the present invention is not limited to this so long as it is possible to generate output image data from image data stored in the storage unit 68. Accordingly, as indicated by the dotted line in FIG. 3, fine scanned data may be stored in place of the output image data. Also, both of the output image data and the fine scanned data may be stored. Further, in addition to these data, image data of thumbnail images may be stored.

When fine scanned data is stored in the storage unit 68, it is required to perform image processing in the image processing unit 62 at the time of red eye compensation processing. Also, in order to eliminate the necessity to set the image processing conditions again, it is required to store the image processing conditions along with the fine scanned data. In this case, however, flexibility as to remaking or reprinting is increased and it becomes possible to change a print size (although extensive changing is impossible), to change color/density of images and the like, and to cope with various kinds of special processing, for instance. As a result, it becomes possible to suitably cope with various requests.

On the other hand, when only the output image data is stored in the storage unit 68, it is impossible to cope with the changing of a print size or the like, although it is sufficient that only red eye compensation is performed at the time of remaking or reprinting, so that it becomes possible to maintain favorable productivity. That is, when red eye compensation mainly corresponds to remaking, it is possible to perform the red eye compensation while minimizing the reduction in productivity at the time of printing with film processing or the like. As a result, this case where only the output image data is stored is most suitable.

When the output image data and the fine scanned data are both stored in the storage unit 68, the storage unit 68 is required to have a large storage capacity, although it becomes possible to solve the inconveniences described above occurring when only one of them is stored.

Which data is to be stored may be determined as appropriate in accordance with the performance, cost, and the like that the photoprinter 10 is required to have while also giving attention to the advantages and the like of each case described below.

When the photoprinter 10 is set in the red eye compensation mode, the red eye compensation unit 70 reads from the storage unit 68 the output image data of each print (frame (image)) whose red eye compensation has been designated, performs red eye compensation processing on the read output image data, and sends resultant image data to the date conversion unit 64 corresponding to the display 18. Also, on receiving an output command (result of the red eye compensation is OK), the red eye compensation unit 70 sends the image data having been subjected to the red eye compensation to the data conversion unit 66 corresponding to the printer 22.

Preferably, the red eye compensation unit 70 also sends image data not having been subjected to the rod eye compensation (output image data stored in the storage unit 68) to the data conversion unit 64 along with the image data having been subjected to the red eye compensation.

The red eye compensation mode basically refers to an operation mode corresponding to remaking or reprinting of each frame, whose print or the like has been outputted once, and is a mode in which the red eye compensation processing is performed during the remaking or reprinting.

In the illustrated example, each frame (output image data) corresponding to a print, whose red eye compensation processing should be performed, is designated using the identification information described above or the like, and the red eye compensation unit 70 reads corresponding output image data from the storage unit 68 in response to this designation. Here, when the red eye compensation mode is set, this frame designation functions as a command to read corresponding image data from the storage unit 68, and this frame reading command functions as a command (trigger) to carry out red eye compensation processing on the frame. As a result, the red eye compensation unit 70 automatically performs the red eye compensation processing on the output image data read from the storage unit 68.

The red eye compensation processing performed in the red eye compensation unit 70 is not specifically limited and it is possible to use various known methods.

For instance, it is possible to use a full-automatic red eye compensation method with which detection of red eyes in images from image data read from the storage unit 68 (red eye detection) is automatically performed through image analysis and correction of the detected red eyes (red eye correction) is automatically performed through image processing.

The method of detecting red eyes is not specifically limited and it is possible to use various known methods.

For instance, it is possible to use a method with which face extraction is performed and pupils and/or red eyes are detected from the extracted face.

It is possible to perform the face extraction with a known method, examples of which include a face detection method based on edge detection or shape pattern detection and a face detection method based on hue extraction or flesh color extraction. Also, it is possible to use a method with which a candidate area is extracted, this candidate area is divided into small areas, characteristic quantities in each small area are matched against a preset face area pattern, and a face area is extracted using the found probability (see JP 2000-137788 A). Further, it is possible to use a method with which face candidate areas are extracted, a probability is evaluated from the overlapping degree of each candidate area, and a face area is extracted (see JP 2000-149018 A). Aside from these methods, it is possible to use a method with which a face candidate area is extracted, a trunk candidate area is extracted when the density of the face candidate area has a value corresponding to a predetermined threshold value, a probability is evaluated using densities, chroma, and contrasts in the face and trunk candidate areas, and a face area is extracted based on the probability (see JP 2000-148980 A).

It is possible to detect red eyes from the extracted face area with a known method.

For instance, it is possible to use a method with which pupil detection is performed using edge detection, shape pattern detection, position information, hue information, and the like and red eye detection is performed using chroma, hue, and the like. Also, it is possible to use a method with which eyes are extracted using edge detection, shape pattern detection, position information, and the like, a low luminance area is extracted from a luminance histogram of image data of the extracted eyes, a pupil area is extracted by performing compression processing on the extracted low luminance area, and red eye detection is performed using chroma, hue, or the like. Further, it is possible to use a method with which image characteristic quantities "Z" of each pixel is obtained using hue or the like by setting a face candidate area as an x-y plane, an x-y-z three-dimensional space is set, the x-y plane is divided based on a mountain-like distribution of a z value, and the red eye detection is performed for each divided area using shape information, statistical image characteristic quantities, and the like (see JP 2000-76427 A).

Also, the method of correcting the detected red eyes is not specifically limited and it is possible to use various known methods.

For instance, it is possible to use a method, with which the red eye correction is performed through color conversion or chroma reduction of the detected red eyes, or a method with which a pixel having the minimum luminance is detected in the detected red eye area and the chroma and luminance at each of other pixels are corrected so as to approach those at the minimum luminance pixel (see JP 2000-76427 A).

It should be noted here that in the present invention, each result of the red eye compensation by the red eye compensation unit 70 is displayed as an image on the display 18 in a manner such that it is possible to modify or amend the red eye compensation result by manipulating the displayed image through a GUI (Graphical User Interface) using the manipulation unit 20 such as the mouse 20b, for example.

Also, it is preferable that the red eye compensation processing is performed in the full-automatic manner described above except for the amendment of the compensation result. However, in order to reduce the required cost and the like of the photoprinter 10 and a processing amount, the red eye compensation processing may be performed in a semi-automatic manner in which the operator also manually performs the designation of red eye positions and the like. Alternatively, a construction may be obtained in which it is possible to appropriately select one of the full-automatic processing and the semi-automatic processing.

The image data converted in the data conversion unit 66 is outputted to the printer 22. In the photoprinter 10, the printer 22 is a known printer.

For instance, it is possible to use a printer (printer/processor) including a printing machine that exposes a light-sensitive material (photographic paper) and a developing machine (processor) that performs development processing on the exposed light-sensitive material. The printing machine modulates each light beam in one of R, G, and B in accordance with image data outputted from the image processing apparatus 14 (data conversion unit 66), deflects the light beam in a main scanning direction to bring the light beam incident at the predetermined recording position, and transports the light-sensitive material in an auxiliary scanning direction perpendicular to the main scanning direction at this recording position, thereby two-dimensionally scanning and exposing the light-sensitive material to record a latent image. On the other hand, the developing machine receives the exposed light-sensitive material from the printing machine, performs predetermined wet development processing including development, bleaching/fixing, rinsing, and the like, and outputs (finished) prints after drying.

Next, the first aspect of the present invention will be described in more detail by explaining an operation of the photoprinter 10.

It should be noted here that the following description will be made by taking, as an example, a case where remaking is performed at the time of simultaneous printing or the like. However, the red eye compensation processing according to the first aspect of the present invention is performed in basically the same manner even at the time of reprinting.

When the film F is set on the carrier 30 of the scanner 12 and a command is inputted to start the operation, the carrier 30 transports the film F and sets a frame to be captured first (first frame, in usual cases) at the predetermined reading position.

Next, the light source 24 is driven to sequentially emit reading light in R, G, and B, thereby performing prescan in which an image in the frame is roughly captured in the manner described above. Next, reading conditions for fine scan are supplied from the setup unit 58 and fine scan is performed by sequentially emitting the reading light in R, G, and B again. In this manner, the frame image is captured by the reading unit 34.

When the capturing of one frame is finished, the carrier 30 further transports the film F and sets the next frame at the reading position, at which an image in this frame is captured in the same manner. By repeating these operations, the images in respective frames of the film F are sequentially captured frame by frame.

The image signal supplied from the reading unit 34 is amplified by the amplifier 36 and is converted by the A/D converter 38 into a digital image signal, which is then sent to the image processing apparatus 14.

In the image processing apparatus 14, first, the signal processing unit 50 performs predetermined correction processing, such as dark correction, on the supplied image signal and subjects a resultant image signal to Log conversion to generate digital image data. Then, the signal processing unit 50 stores prescanned data in the pFM 52 and stores fine scanned data in the fFM 54.

After prescanned data is stored in the pFM 52, the setup unit 58 reads this prescanned data, performs image analysis on the read data, sets reading conditions for fine scan, and sends the set reading conditions to the scanner 12. The setup unit 58 also determines image processing conditions to be applied to this frame (image) and sets the image processing conditions in the verification processing unit 60 and the image processing unit 62.

After the image processing conditions are set, the verification processing unit 60 reads the prescanned data from the pFM 52, performs image processing on the read data, and sends resultant data to the data conversion unit 64 as verification image data. The data conversion unit 64 converts the supplied verification image data into image data for displaying, which is then displayed on the display 18 as a verification image.

When the verification image is displayed, the operator performs verification and performs amendment of this image (amendment of image processing conditions) as necessary. If a result of the verification is OK, the operator issues an output command for this frame and the image processing conditions for the frame are determined. Following this, the verification of the next image (next frame) is started.

In response to the output command issued in response to the OK result of the verification, the image processing unit 62 reads fine scanned data of the frame, performs image processing on the read data under the determined image processing conditions, and sends resultant data to the data conversion unit 66 as image data for outputting.

The image processing unit 62 also sends the image data for outputting to the storage unit 68, in which the supplied image data for outputting is stored so that this image data is associated with the aforementioned identification information.

The data conversion unit 66 converts the image data for outputting using the 3D-LUT or the like into image data suited for image recording by the printer 22, and sends the resultant image data to the printer 22.

On receiving the image data from the data conversion unit 66, the printer 22 forms a latent image by two-dimensionally scanning and exposing a light-sensitive material using light beam modulated in accordance with the image data in the printing machine. Next, the printer 22 performs the predetermined wet development processing on the exposed light-sensitive material and outputs (finished) prints after drying in the developing machine.

The prints outputted from the photoprinter 10 in this manner are inspected at a predetermined timing. If any prints are judged as NG prints (inappropriate products), reprinting of these NG prints is performed.

When red eye compensation is performed during this reprinting, the photoprinter 10 is set in the red eye compensation mode in response to a command from the operator.

In the red eye compensation mode, first, the operator designates a frame (image) corresponding to a print for which red eye compensation should be performed, that is, inputs a command to read corresponding image data from the storage unit 68. Note that the reading command may be inputted so that image data of multiple frames to be subjected to red eye compensation is read by one operation.

The command to read the frame to be subjected to the red eye compensation may be made by inputting the identification information described above, that is, the serial number of a print, the frame number of the print, a film ID, or the like using the keyboard 20a or the like. Alternatively, images of image data may be displayed on the display with reference to an inputted film ID, print output date and time, and the like, and the operator may input the command to read the frame to be subjected to the red eye compensation processing through a GUI or the like.

As described above, in the red eye compensation mode, the frame reading command functions as a command to execute the red eye compensation processing on the frame. Accordingly, in response to the input of the frame reading command, the red eye compensation unit 70 reads corresponding output image data from the storage unit 68. Next, the red eye compensation unit 70 automatically performs the aforementioned full-automatic red eye compensation processing and sends image data obtained as a result of the red eye compensation to the data conversion unit 64 corresponding to the display 18.

Preferably, the red eye compensation unit 70 also sends output image data not having been subjected to the red eye compensation processing to the data conversion unit 64.

Figure 4:
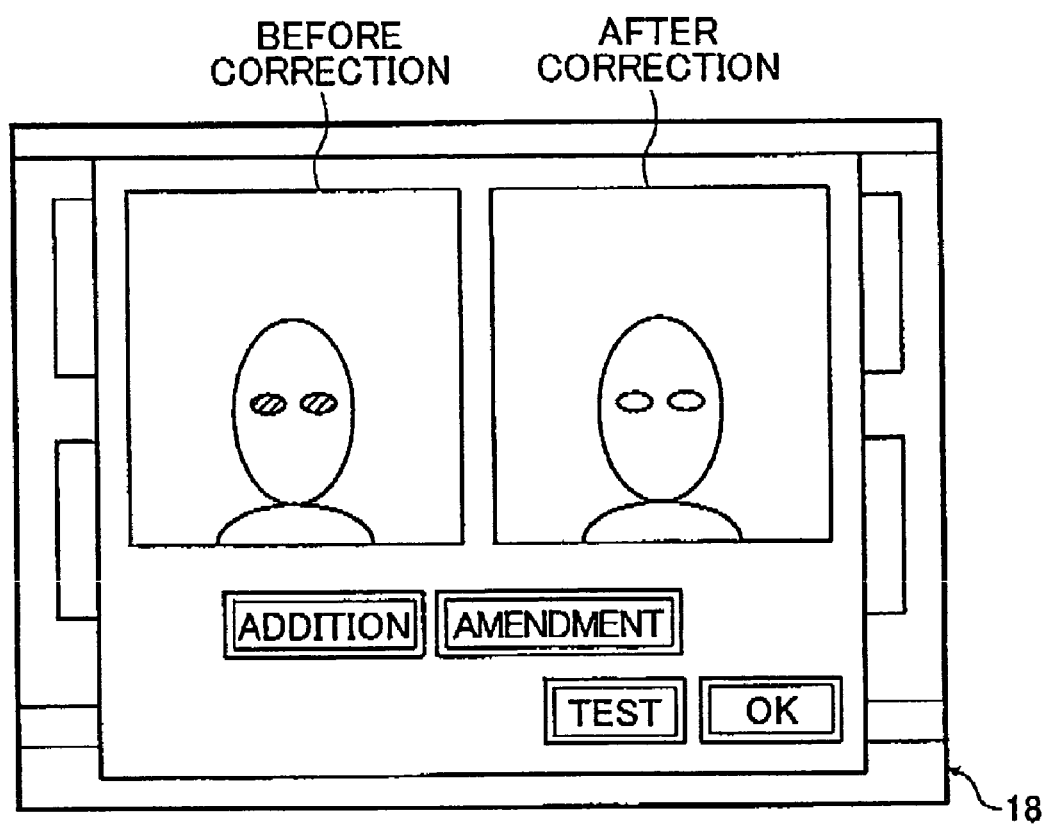
FIG. 4 is a conceptual diagram of an example of a screen through which a result of red eye compensation is confirmed.

The data conversion unit 64 converts both of these image data into image data suited for displaying on the display 18 and displays images of the image data on the display 18 side by side. FIG. 4 is a schematic diagram of an example of a screen displayed as a result of these operations.

When the operator confirms a result of the red eye compensation and finds another pupil for which red eye compensation needs to be performed, he/she pushes (clicks) an addition button using the mouse 20b or the like. In response to this manipulation, the red eye compensation unit 70 performs red eye detection and red eye correction again and sends a corrected image to the data conversion unit 64.

Also, when it is required to amend a result of the red eye compensation, the operator pushes an "amendment" button and performs amendment of the red eye compensation result (amendment of a red eye compensation image) using the mouse 20b or the like in the same manner as in the case of retouch software, for instance. Note that when the "amendment" button is pushed, there may be issued a command to delete the red eye compensation result (a command to return to a pre-compensation state).

When the result of the full-automatic red eye compensation is appropriate or when the red eye compensation result becomes appropriate as a result of the amendment or the like, the operator pushes an "OK" button. In response to this manipulation, the red eye compensation unit 70 sends image data obtained as a result of the red eye compensation to the data conversion unit 66. Note that when a "test" button is pushed, test printing is performed.

Following this, the same processing as at the time of printing with film processing is performed. That is, the image data converted in the data conversion unit 66 is supplied to the printer 22, which then outputs a print (reprint) of the frame.

It should be noted here that the above-mentioned confirmation and amendment of the red eye compensation result may be performed frame by frame (sequential confirmation scheme) or performed on multiple frames by one operation (batch confirmation scheme). Alternatively, both of these confirmation schemes may be set as selectable.

In the conventional photoprinter, even when red eye compensation processing is performed at the time of reprinting or remaking, in order to perform the red eye compensation processing, it is required to capture images from a film again by performing prescan and fine scan (re-reading of photographed image data is performed in the case of printing from a digital camera) and to perform the setting of image processing conditions and image processing. As a result, as already mentioned, operability and productivity (processing efficiency) are lowered.

In contrast to this, according to the present invention, image data for outputting or fine scanned data are stored and, when red eye compensation is designated, corresponding image data is read and the red eye compensation processing is performed on the read image data. With this construction, even when the red eye compensation is performed at the time of remaking or reprinting, it is not required to perform the capturing of images from a film again, which improves operability and productivity. Also, image data for outputting is stored as described above, so that it also becomes unnecessary to set image processing conditions and to perform image processing, such as color/density correction, again in order to perform the red eye compensation at the time of remaking or reprinting. Further, it becomes possible to further improve the productivity at the time of printing with film processing in which red eye compensation processing is also performed.

It should be noted here that the red eye compensation method and the image processing apparatus according to the first aspect of the present invention are not limited to the example described above. For instance, in the above example, the red eye compensation mode is prepared and, when this mode is set, the designation of a frame (image) to be remade or reprinted (command to read the frame) functions as a command to execute red eye compensation processing on this frame. However, the present invention is not limited to this and the red eye compensation mode is not prepared and the aforementioned red eye compensation may be started in response to a designation of a frame and a designation of red eye compensation processing. Alternatively, even if the red eye compensation mode is prepared, the red eye compensation processing may be performed as appropriate with reference to a frame designation and a red eye compensation processing designation inputted when an operation mode other than the red eye compensation mode is set.

As described in detail above, according to the first aspect of the present invention, it becomes possible to perform red eye compensation processing at the time of remaking or reprinting with efficiency by eliminating the necessity to capture images again and the like. As a result, it becomes possible to improve operability and productively of a digital photoprinter at the time of red eye compensation processing.

The red eye compensation method and image processing apparatus according to the first aspect of the present invention are basically constructed in the manner described above.

Second Aspect

Next, an image processing method according to a second aspect of the present invention will be described with reference to FIGS. 1, 2, and 5 to 8B.

Figure 5:
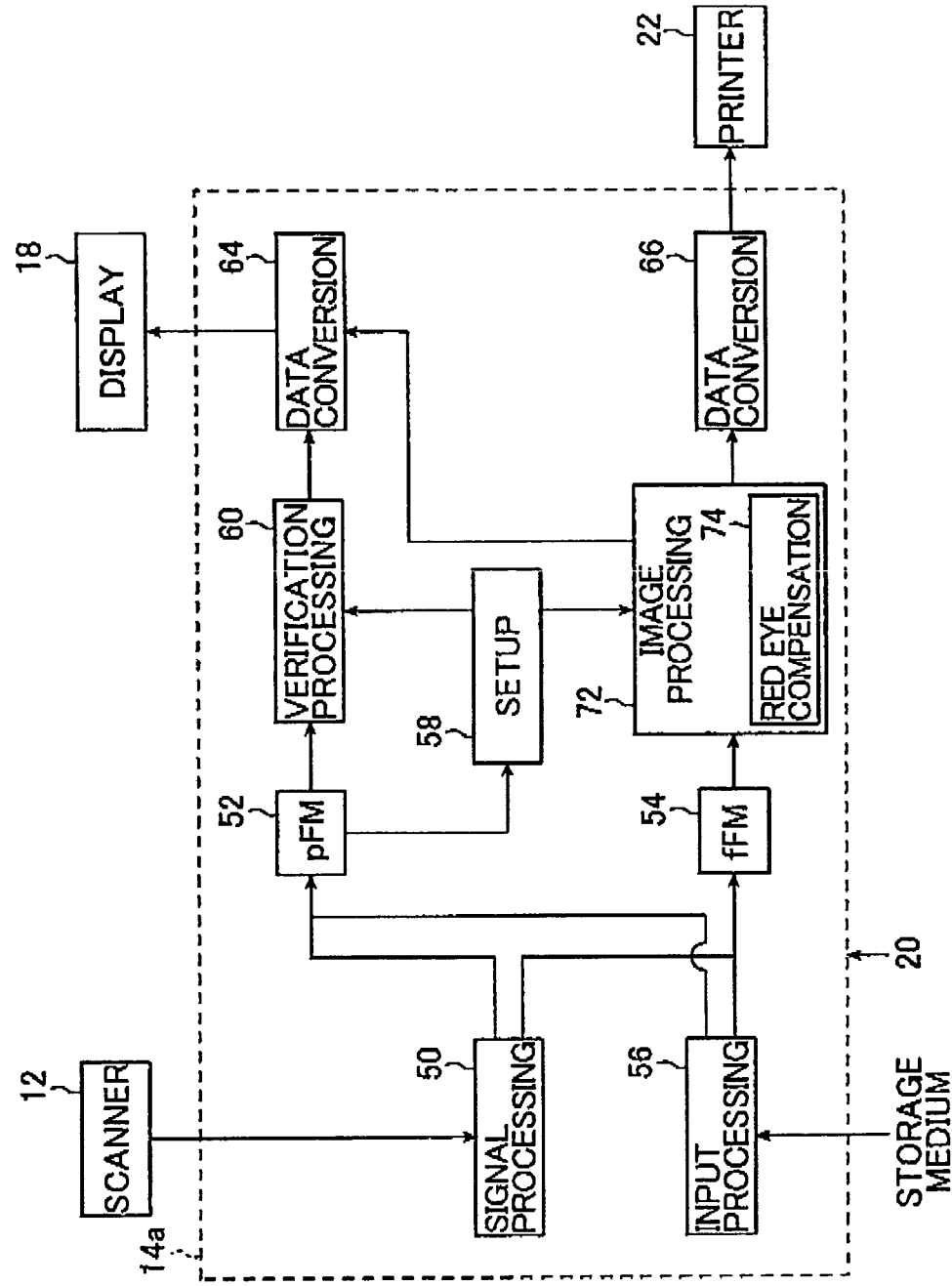
FIG. 5 is a block diagram of another example of the image processing apparatus of the digital photoprinter shown in FIG. 1.

An image processing apparatus 14a shown in FIG. 5 is used to implement the image processing method according to the second aspect of the present invention. The image processing apparatus 14a shown in FIG. 5 is used in place of the image processing apparatus 14 provided for the digital photoprinter 10 shown in FIG. 1, and has the same construction as the image processing apparatus 14 shown in FIG. 3 except for that an image processing unit 72 including a red eye compensation unit 74 is used in place of the image processing unit 62, the storage unit 68, and the red eye compensation unit 70 in the image forming apparatus 14. Therefore, the same construction elements as in the first aspect are given the same reference numerals and the detailed description thereof will be omitted.

Incidentally, when the image processing method according to the second aspect of the present invention is implemented, a normal mode and a high-speed mode may be prepared as modes for capturing and processing images on the film F in the photoprinter 10 of the illustrated example. In this case, there is obtained a construction where both of these modes are selectable with a known method.

The normal mode refers to a mode in which, as described above, the image in each frame is captured by two scans that are prescan and fine scan.

For instance, in the illustrated example, the film F is transported by the carrier 30 to make one round trip, with prescan for determining reading conditions for fine scan and image processing conditions to be used in the image processing apparatus 14a (such as the image processing unit 72) being performed from the last frame (or the first frame) during outward journey, and with fine scan for obtaining image data for outputting being performed from the first frame (or the last frame) during homeward journey. Accordingly, the reading order of frames is reversed between the prescan and the fine scan. Also, as will be described in detail later, the photoprinter 10 of the illustrated example performs verification of six frames at a time, for instance. Also, the prescan is successively performed for every frame of one roll of film but the fine scan is performed in response to the completion of verification performed in units of six frames.

It should be noted here that the fine scan and the prescan are not limited to the execution in the outward journey and the homeward journey. For instance, after the prescan from the first frame is finished, the film may be rewound until the first frame, and the fine scan may be performed by transporting the film in the same direction as during the prescan.

On the other hand, the high-speed mode is a mode for improving productivity by skipping prescan and performing only fine scan. In the illustrated example, the film is intermittently transported by the carrier 30 only in one direction in the manner described above, thereby successively performing the fine scan on every frame of one roll of film.

Also, when the high-speed mode is set, prior to the fine scan, pre-photometry (transmitted light quantity measurement or density measurement) is performed for the entire area of each frame of the film F, and reading conditions for the fine scan are determined by a control unit of the scanner 12 (not shown), for instance.

According to the illustrated example, in the area CCD sensor of the reading unit 34, one pixel line extending in a direction perpendicular to the film transporting direction on the uppermost stream side in the film transporting direction (on the uppermost stream side of a mask passing area) may be used as a line sensor. In this case, when each frame of the film F is transported to the reading position, the pre-photometry is performed for the frame through photometry using this line sensor. Note that the method of performing the pre-photometry is not limited to this and, needless to say, a sensor for performing the pre-photometry may be separately provided on the upstream side of the reading position.

It should be noted here that it is sufficient that the reading conditions for fine scan are determined with a known method regardless of whether the normal mode or the high-speed mode is set. For instance, the quantity of light emitted from the light source and an accumulation time period, with which no saturation occurs in the area CCD sensor in a highlight area, are determined for the fine scan as appropriate with reference to a result of the prescan and the pre-photometry.

Also, it is basically preferable that when prints are created from image data photographed with a digital camera or the like, image processing and the like are performed in the high-speed mode.

It should be noted here that the construction in the first aspect may also be changed so that the normal mode and the high-speed mode are used as in this second aspect.

In the second aspect of the present invention, as shown in FIG. 5, the image processing apparatus 14a basically includes a signal processing unit 50, a prescan (frame) memory 52, a fine scan (frame) memory 54, an input processing unit 56, a setup unit 58, a verification processing unit 60, an image processing unit 72, and data conversion units 64 and 66. Also, the image processing unit 72 includes the red eye compensation unit 74.

It should be noted here that, in this aspect, it is possible to store processed image data obtained as a result of prescan and reduced image data obtained in the high-speed mode (hereinafter collectively referred to as "prescanned data" in this aspect) in the prescan memory (pFM) of the signal processing unit 50.

Also, as already mentioned, the setup unit 58 reads the prescanned data stored in the pFM 52, performs image analysis using the prescanned data on the read data, and determines image processing conditions to be used in the verification processing unit 60 and the image processing unit 72. In the normal mode, the setup unit 58 also determines reading conditions for fine scan using the prescanned data and sends the reading conditions to the scanner 12.

Further, when any images are amended by an operator as a result of verification, the setup unit 58 amends the image processing conditions set in the verification processing unit 60 and the image processing unit 72 in accordance with the image amendment.

It should be noted here that image processing performed on the prescanned data in the verification processing unit 60 corresponds to the creation of verification images and is similar to image processing performed in the image processing unit 72 to the described later. Also, the image processing conditions in the verification processing unit 60 are basically the same as those in the image processing unit 72.

Further, on receiving image data of a red eye frame to be described later from the image processing unit 72, the data conversion unit 64 converts this image and displays a screen, through which a result of red eye compensation is to be verified, on the display 18.

As will be described in detail later, in the photoprinter 10 according to this aspect, the screen (verification screen), in which the verification images are displayed, doubles as a screen through which the operator designates a frame for which the red eye compensation processing should be performed again (designation of a red eye frame). Accordingly, when the verification images are displayed, the operator performs the designation of a red eye frame in addition to the verification.

It should be noted here that the method of designating the red eye frame is not specifically limited and it is sufficient that the red eye frame designation is performed with a known method such as clicking with the mouse 20b.

Here, in this aspect, it is preferable that auxiliary information, with reference to which the occurrence of red eyes is judged, is displayed for each frame along with its verification image in this verification screen.

The method of displaying the auxiliary information is not specifically limited. For instance, it is possible to use a method with which a notification showing a possibility of red eye occurrence is displayed on the screen, a method with which a mark showing the possibility of red eye occurrence is displayed on the screen, a method with which the frame of each verification image having the possibility of red eye occurrence is flashed, or the like.

Further, the possibility of red eye occurrence may be estimated by the setup unit 58 with reference to a result of image analysis using a degree of under-exposure, an average density, a dynamic range, a face extraction result, the maximum value and the minimum value of each of R, G, and B image data, and the like. Also, when information showing whether images were photographed with the aid of an electronic flash is recorded as magnetic information of an APS film or is recorded on tags of image files of a digital camera, it is possible to use this information. Further, as the auxiliary information, information about each image analysis described above may be displayed.

On the other hand, like the image processing unit 62 shown in FIG. 3, the image processing unit 72 performs image processing on the fine scanned data read from the fFM 54 to generate output image data suited for outputting images such as print images, and sends the output image data to the data conversion unit 66 or the like.

The image processing performed in the image processing unit 72 is the same as that performed in the image processing unit 62 shown in FIG. 3. Also, the image processing unit 72 includes the red eye compensation unit 74 and performs red eye compensation processing on each red eye frame in addition to the various kinds of image processing described above.

Here, the red eye compensation processing performed in the red eye compensation unit 74 is not specifically limited as in the case of the red eye compensation unit 70 shown in FIG. 3, and therefore it is possible to use various known methods. For instance, it is possible to use a full-automatic red eye compensation processing method with which red eyes in images are automatically detected (red eye detection) from image data through image analysis and correction of the detected red eyes (red eye correction) is automatically performed through image processing. In this aspect, the same red eye compensation method as in the case of the red eye compensation unit 70 shown in FIG. 3 is used to perform the red eye detection and the red eye correction.

Here, it is preferable that in such red eye compensation processing face extraction is performed using the prescanned data and the red eye detection is performed using the fine scanned data.

Usually, in such full-automatic red eye compensation, the processing from the face extraction to the red eye detection is entirely performed using the fine scanned data (high-resolution data). With this construction, however, the amount of data to be processed becomes large and therefore a long time is taken to perform the red eye compensation processing.

In contrast, in this aspect, the face extraction is performed using the prescanned data (low-resolution data) and the red eye detection is performed using the fine scanned data based on a result of the face extraction. As a result, it becomes possible to increase the speed of the processing and to improve productivity.

The second aspect of the present invention will be described in more detail below by explaining an operation of the photoprinter 10 shown in FIG. 1 with reference to FIGS. 1, 2, and 5 to 8B.

As described above, the photoprinter 10 has two modes that are the normal mode, in which each image is captured by two scans that are prescan and fine scan, and the high-speed mode in which only the fine scan is performed. First, an example of an operation performed in the normal mode will be described with reference to FIG. 6A.

When the film F is set on the carrier 30 of the scanner 12 and a command is inputted to start the operation, the scanner 12 performs prescan from the last frame ($24^{th}$ frame, in the illustrated example) until the first frame in the manner described above. The image signal of each frame is sent to the image processing apparatus 14a, is processed in the signal processing unit 50 to generate prescanned data of each frame, which is then stored in the pFM 52.

When the prescanned data of every frame is stored in the pFM 52, the setup unit 58 sequentially reads the prescanned data, starting from the first frame. Then, the setup unit 58 sets reading conditions for fine scan for each frame and supplies the set reading conditions to the scanner 12. The setup unit 58 also sets image processing conditions for each frame and sends the image processing conditions to the verification processing unit 60 and the image processing unit 72.

When the image processing conditions for the first to sixth frames are set, the verification processing unit 60 sequentially reads the prescanned data, starting from the first frame. Then, the verification processing unit 60 processes the read prescanned data under the set image processing conditions to generate verification image data, and sends the verification image data to the data conversion unit 64.

The data conversion unit 64 converts this image data into image data suited for displaying on the display, and displays the resultant image data on the display 18 as verification images.

Figure 7A:
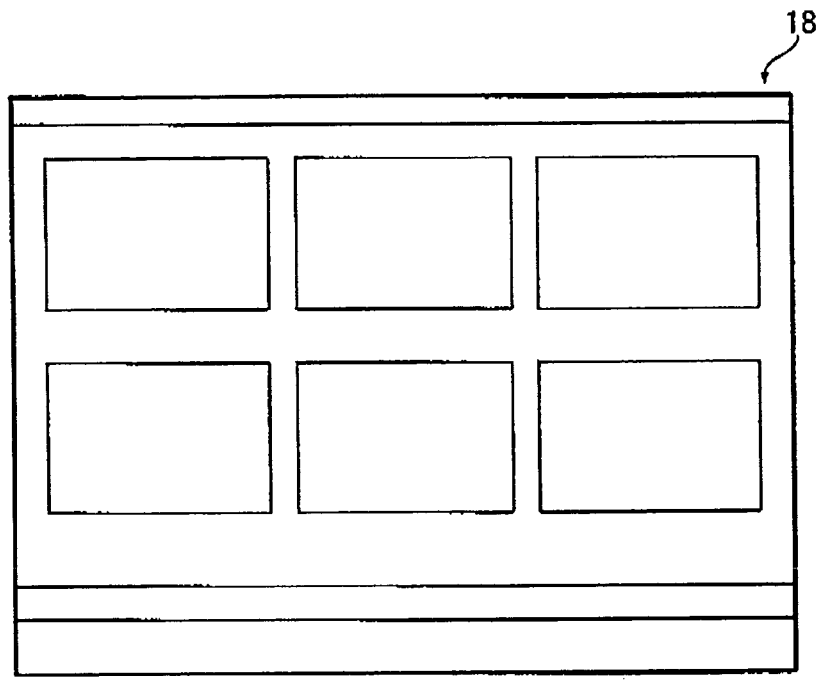
FIGS. 7A and 7B are each a conceptual diagram of an example of a verification screen and an example of a red eye compensation confirmation screen displayed with the image processing method of the present invention.

In the illustrated example, the verification processing unit 60 performs this operation in units of six frames, as an example. Therefore, at the point in time when six verification images are displayed on the display 18 as schematically shown in FIG. 7A, the verification processing unit 60 suspends the creation of the verification images, and at the same time, the operator conducts verification.

It should be noted here that the number of frames to be verified at a time does not necessarily coincide with the number of verification images that can be displayed on the display at a time. In addition, needless to say, the number of verification images displayed at the same time is not limited to six. Further, it is not necessary to simultaneously display multiple verification images and therefore the verification images may be sequentially displayed one by one. Also, the number of verification images to be concurrently displayed and the number of frames to be verified by one operation may be selectable or automatically changed in accordance with the kind of processing designated, a desired print size, and the like.

The verification is performed in the same manner as in the case of an ordinary (digital) photoprinter. Therefore, image color/density and the like are corrected for each frame as necessary using the keyboard 20a, the mouse 20b, and the like, and the image processing conditions and the like are changed in accordance with a result of the correction.

Further, as described above, the verification screen, in which the verification images are displayed, doubles as a unit that designates each red eye frame (red eye frame designation screen), and the operator checks the verification images and marks each frame that he/she judges as a red eye frame by clicking it with the mouse 20b or the like (red eye frame designation). In the illustrated example, the frame given a sign "o" (fourth frame) is marked as a red eye frame. Note that as already mentioned, it is preferable that auxiliary information facilitating the red eye frame designation by the operator is also displayed in the verification screen, not only in this aspect.

When the verification of the first to sixth frames is finished, the operator issues an output command (result of the verification is OK). In response to this output command, image processing conditions for these frames are determined and fine scan and image processing are started so that the frames are sequentially processed, starting from the first frame.

Further, when setting of the image processing conditions is finished, the fine scan is started, and at the same time, creation and displaying of verification images of the next group of six frames (seventh to $12^{th}$ frames) are started.

As in the case described above, when the scanner 12 finishes the fine scan, the image signal of each frame is sent to the image processing apparatus 14a and is processed by the signal processing unit 50 to generate fine scanned data of each frame, which is then stored in fFM 54.

After the fine scanned data is stored in the fFM 54, the image processing unit 72 reads the fine scanned data and performs image processing on the read data under the determined image processing conditions. The image processing unit 72 also performs red eye compensation processing on each red eye frame to generate output image data.

On the other hand, in parallel with the fine scan and image processing for the first to six frames, the verification processing unit 60 and the data conversion unit 64 perform creation and displaying of verification images of the seventh to $12^{th}$ frames. At the point in time when the verification images for these six frames are displayed, the operator conducts verification and performs marking of each red eye frame, as in the case of the first to sixth frames. Note that, in the illustrated example, the eighth frame and the tenth frame are each marked as a red eye frame.

Here, in this aspect, as to each frame other than the red eye frames, the image processing unit 72 sends output image data of the frame to the data conversion unit 66 at the point in time when image processing of the fine scanned data is finished. Next, the image processing unit 72 reads the fine scanned data of the next frame from the fFM 54 and starts image processing.

In contrast, as to each red eye frame, at the point in time when the image processing and the red eye compensation processing are finished, the image processing unit 72 sends output image data of the frame before the red eye compensation and the output image data of the frame after the red eye compensation to the data conversion unit 64 corresponding to the display 18. Also, in response to this operation, the image processing apparatus 14a suspends the verification.

Figure 7B:
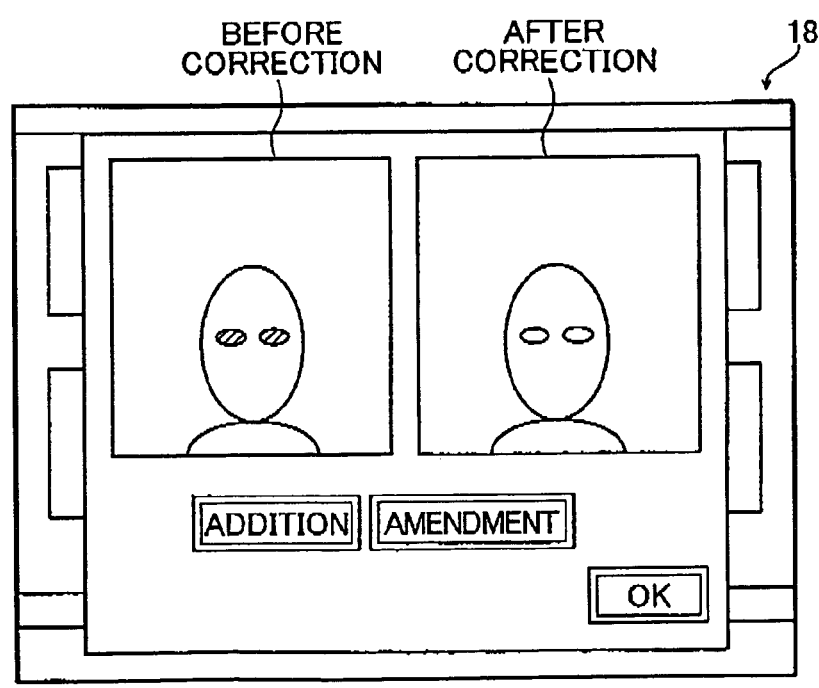

The data conversion unit 64 converts both of these image data into image data suited for displaying on the display 18 and displays a red eye compensation confirmation screen, in which both of the data are displayed side by side, on the display 64. In the illustrated example, processing of the fourth frame that is a red eye frame is finished midway through the verification of the seventh to $12^{th}$ frames, so that the verification is suspended at this point in time. Then, as shown in FIG. 7B, a red eye compensation confirmation screen is displayed so that it is overlaid on the verification screen.

When the confirmation screen is displayed, the operator performs confirmation of a result of the red eye compensation (red eye compensation confirmation) and makes amendments to the red eye compensation result (red eye compensation amendment) as necessary.

When it is necessary to perform red eye compensation on another pupil in the image, for instance, the operator pushes (clicks) the "addition" button using the mouse 20b or the like, in response to which the red eye compensation unit performs additional red eye compensation processing. Also, when it is necessary to make an amendment to a pupil having been subjected to red eye compensation, the operator pushes the "amendment" button and then performs the amendment using the mouse 20b or the like in the same manner as in the case of various kinds of retouch software, for instance.

If the result of the red eye compensation is OK (confirmation is completed), the operator pushes the "OK" button. In this manner, image processing of this frame is completed.

In response to this completion of confirmation, the image processing unit 72 sends output image data of the red eye frame to the data conversion unit 66. Then, the image processing unit 72 reads the fine scanned data of the next frame from the fFM 54 and performs processing on this data. Also, in response to the completion of confirmation, the verification (of the seventh to $12^{th}$ frames) is resumed.

In the illustrated example, the fourth frame is a red eye frame. Therefore, during the processing of the first to fourth frames, the image processing unit 72 automatically starts processing of the next frame at the point in time when processing of a previous frame is finished. When the image processing of the first to third frames is finished, the image processing unit 72 sends their output image data to the data conversion unit 66. Further, in response to the completion of confirmation of a result of the red eye compensation performed on the fourth frame, the image processing unit 72 sends output image data of the fourth frame to the data conversion unit 66 and starts processing of the fifth frame.

The data conversion unit 66 converts the output image data into image data suited for image recording by the printer 22 and outputs the resultant image data to the printer 22, which then performs creation of prints in the manner described above. Following this, the data conversion unit 66 repeats the same operation as above, so that the description thereof will be omitted hereinafter.

On the other hand, as in the above case, when the verification of the seventh to $12^{th}$ frames is finished and there is obtained a state where it is possible to perform fine scan of these frames, the fine scan and image processing of these frames are started. Also, at the same time, creation and displaying of verification images of the next group of six frames ($13^{th}$ to $18^{th}$ frames) are started.

When the verification images of those six frames are created, in parallel with the fine scan and image processing, verification of the $13^{th}$ to $18^{th}$ frames and marking of each red eye frame are started (no red eye frame exists in this frame group).

As described above, in the group of the seventh to $12^{th}$ frames for which the fine scan and the image processing are being performed at this point in time, the eighth frame and the tenth frame are each marked as a red eye frame.

Accordingly, as to each frame other than those red eye frames, at the point in time when the image processing is finished, its output image data is sent from the image processing unit 72 to the data conversion unit 66 and processing of the next frame is started.

On the other hand, the eighth frame and the tenth frame are subjected to red eye compensation processing in addition to the image processing, and when those processing is finished, verification of the $13^{th}$ to $18^{th}$ frames is suspended as in the above case and the red eye compensation confirmation screen shown in FIG. 7B is displayed. Following this, the operator performs amendment and confirmation, and when the confirmation of a result of the red eye compensation is completed, the image processing unit 72 sends output image data to the data conversion unit 66, processes fine scanned data of the next frame (the ninth frame and the $11^{th}$ frame), and resumes the verification of the $13^{th}$ to $18^{th}$ frames.

Hereinafter, in the same manner, when the verification of the $13^{th}$ to $18^{th}$ frames is finished and there is obtained a state where it is possible to perform fine scan of those frames, the fine scan and image processing are started, and at the same time, creation of verification images of the $19^{th}$ to $24^{th}$ frames is started.

Further, when the verification images of the $19^{th}$ to $24^{th}$ frames are displayed, verification and marking of each red eye frame are performed. Also, concurrently with completion of the verification, if possible, the fine scan and the image processing are performed and output image data is sent to the data conversion unit 66.

Figure 6A:
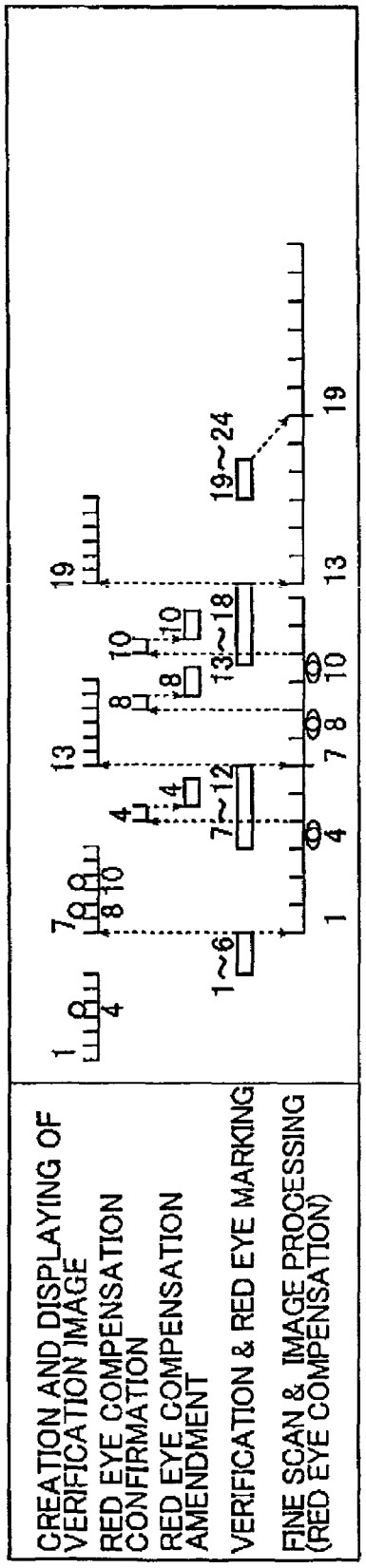
FIGS. 6A and 6B are each a schematic time chart of an example of an operation performed with the image processing method of the present invention.
Figure 6B:
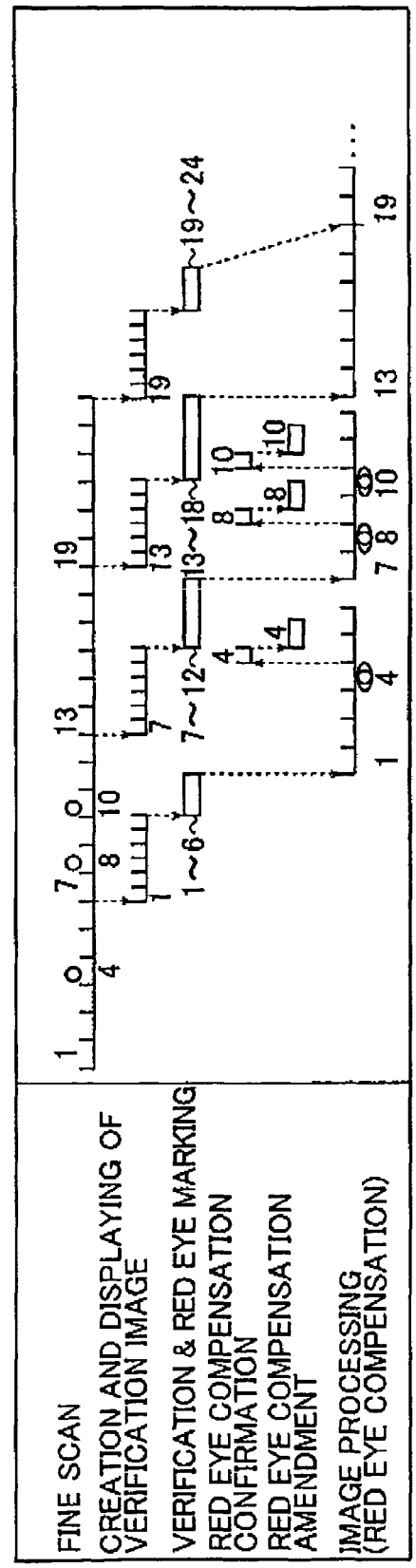

Next, an example of an operation performed in the high-speed mode will be described with reference to FIG. 6B.

It should be noted here that many operations and manipulations, such as manipulations during verification and confirmation of red eye compensation results, are performed in the same manner regardless of whether the normal mode or the high-speed mode is set, so that the same points will be omitted and different points will be mainly described in the following description, thereby simplifying the description and making it clear how an operation is performed in this high-speed mode.

As described above, in the high-speed mode, when the film F is loaded into the carrier 30 and a command is inputted to start the operation, the scanner 12 successively performs fine scan on every frame of one roll of film, starting from the first frame and ending in the 24$^{th}$ frame. Note that prior to the fine scan pre-photometry is performed and reading conditions for the fine scan are determined in accordance with a result of the pre-photometry, as described above.

The image signal obtained as a result of the fine scan is sent from the scanner 12 to the signal processing unit 50 of the image processing apparatus 14a. The signal processing unit 50 processes the image signal in the same manner as above to generate fine scanned data, and generates prescanned data by thinning out the fine scanned data. Here, the prescanned data is stored in the pFM 52 and the fine scanned data is stored in the fFM 54.

After the prescanned data is stored in the pFM 52, the setup unit 58 reads the prescanned data, determines image processing conditions for each frame, and sets the image processing conditions in the verification processing unit 60 and the image processing unit 72.

When fine scan of the first group of six frames (first to sixth frames) and setting of image processing conditions for those frames are finished, the verification processing unit 60 reads the prescanned data from the pFM 52 and performs image processing on the read data. The verification processing unit 60 then sends verification image data to the data conversion unit 64 and displays the data as verification images.

As in the above case, when the verification images of those six frames are displayed, the operator verifies the first to sixth frames and marks each red eye frame. When the verification is finished, the operator inputs an output command. In this example, as in the above case, the fourth frame is marked as a red eye frame.

When the verification of the first to sixth frames is finished and an output command is issued, the image processing unit 72 reads the fine scanned data and performs image processing on the read data, starting from the first frame.

Further, at the point in time when the verification of the first to sixth frames is finished and fine scan of the next group of six frames (seventh to 12$^{th}$ frames) is finished, verification images of this next frame group are created and displayed. When the created verification images are displayed, verification of the seventh to 12$^{th}$ frames and marking of each red eye frame are performed (as in the above case, the eight frame and the tenth frame are marked).

Here, the same processing is performed in the image processing unit 72 regardless of whether the high-speed mode or the normal mode is set.

That is, as to each frame other than the red eye frames, at the point in time when image processing is finished, output image data of the frame is sent to the data conversion unit 66 and processing of the next frame is started. On the other hand, as to each red eye frame, at the point in time when red eye compensation processing is finished, output image data of this red eye frame before and after the red eye compensation is sent to the data conversion unit 64. Then, the verification is suspended and the red eye confirmation screen shown in FIG. 7B described above is displayed on the display 18. Through this red eye confirmation screen, the operator performs red eye compensation confirmation and makes amendments as necessary. In response to the completion of the confirmation of the red eye compensation result, the output image data is sent to the data conversion unit 66 and processing of the next frame is started.

In this example, the fourth frame is marked as a red eye frame. Therefore, as to each of the first to third frames, when its image processing is finished, the image processing unit 72 sends output image data of the frame to the data conversion unit 66, reads the next frame, and performs image processing on the next frame.

On the other hand, after image processing is performed on the fourth frame, the image processing unit 72 sends output image data of the fourth frame before and after the red eye compensation to the data conversion unit 64. In response to this operation, verification of the seventh to 12$^{th}$ frames is suspended, a confirmation screen is displayed on the display 18, and red eye compensation confirmation is performed and amendments are made. Further, when the red eye compensation confirmation is completed, the image processing unit 72 sends output image data having been subjected to the red eye compensation to the data conversion unit 66 and performs processing of fine scanned data of the next fifth frame. Then, the verification is resumed.

When outputting of output image data of the first to sixth frames is finished and verification of the seventh to 12$^{th}$ frames is finished, the image processing unit 72 starts image processing of fine scanned data of the seventh to 12$^{th}$ frames, starting from the seventh frame.

On the other hand, when the verification of the seventh to 12$^{th}$ frames is finished and fine scan of the 13$^{th}$ to 18$^{th}$ frames is finished, the eye detection processing unit 60 creates and displays verification images of the 13$^{th}$ to 18$^{th}$ frames. Then, verification of those images and marking of each red eye frame are performed through a screen in which the verification images of the 13$^{th}$ to 18$^{th}$ frames are displayed (no red eye frame exists in this example).

Here, in the group of the seventh frame to the 12$^{th}$ frame, the eighth frame and the tenth frame are each marked as a red eye frame, so that output image data of each frame other than those red eye frames is sent to the data conversion unit 66 concurrently with completion of image processing of the frame and processing of the next frame is started. On the other hand, the eighth frame and the tenth frame are subjected to red eye compensation processing in addition to image processing. Then, images of those frames before and after the red eye compensation processing are displayed in a confirmation screen through which the operator performs confirmation, amendment, and the like. In response to the completion of red eye compensation confirmation, output image data is sent to the data conversion unit 66 and image processing of fine scanned data of the next frame is performed.

Further, as already mentioned, in parallel with image processing of the seventh to 12$^{th}$ frames, verification of the 13$^{th}$ to 18$^{th}$ frames is performed. During this verification, however, the red eye compensation processing of the tenth frame is finished. Therefore, at this point in time, the verification is suspended and the red eye compensation confirmation screen is displayed, thereby allowing the operator to conduct red eye compensation confirmation. When the red eye compensation confirmation is completed, the verification is resumed.

It should be noted here that, as a matter of course, if the red eye compensation confirmation of the eighth frame is performed even when creation of the verification images of the 13$^{th}$ to 18$^{th}$ frames is finished, verification is performed after this red eye compensation confirmation is completed.

When output image data of the seventh to 12$^{th}$ frames is outputted and verification of the 13$^{th}$ to 18$^{th}$ frames is finished, the image processing unit 72 starts processing of fine scanned data of the 13$^{th}$ to 18$^{th}$ frames, starting from the 13$^{th}$ frame.

On the other hand, when the verification of the 13$^{th}$ to 18$^{th}$ frames is finished and fine scan of the 19$^{th}$ to 24$^{th}$ frames is finished, creation of verification images of the 19$^{th}$ to 24$^{th}$ frames is performed, starting from the 19$^{th}$ frame. Following this, the same processing as above is performed until output image data of the 24$^{th}$ frame is outputted to the data conversion unit 66.

In the above image processing method according to the first embodiment of the second aspect of the present invention, as to each frame (red eye frame) having been subjected to the red eye compensation, at the point in time when its red eye compensation processing is finished, a red eye compensation confirmation screen is displayed and the operator performs red eye compensation confirmation without delay (sequential confirmation scheme).

The image processing method according to the second embodiment of the second aspect of the present invention, however, does not perform the red eye compensation confirmation each time red eye compensation processing is performed. That is, the red eye compensation confirmation is performed after red eye compensation processing of every red eye frame is finished, meaning that the operator performs the red eye compensation confirmation of every red eye frame at a time (batch confirmation scheme).

Even with this batch confirmation scheme, as in the case of the sequential confirmation scheme described above, there are prepared two modes that are a normal mode, in which images are read by two scans that are prescan and fine scan, and a high-speed mode in which image reading is performed only once through fine scanning.

Here, with the batch confirmation scheme, many operations and manipulations are performed in the same manner as in the case of the sequential confirmation scheme. For instance, prescan and fine scan in the case of the normal mode, pre-photometry and fine scan in the case of the high-speed mode, manipulations during verification, and confirmation of a red eye compensation result are performed in the same manner as in the case of the sequential confirmation scheme. Therefore, as in the above description, different points will be mainly described in the following description.

Figure 8A:
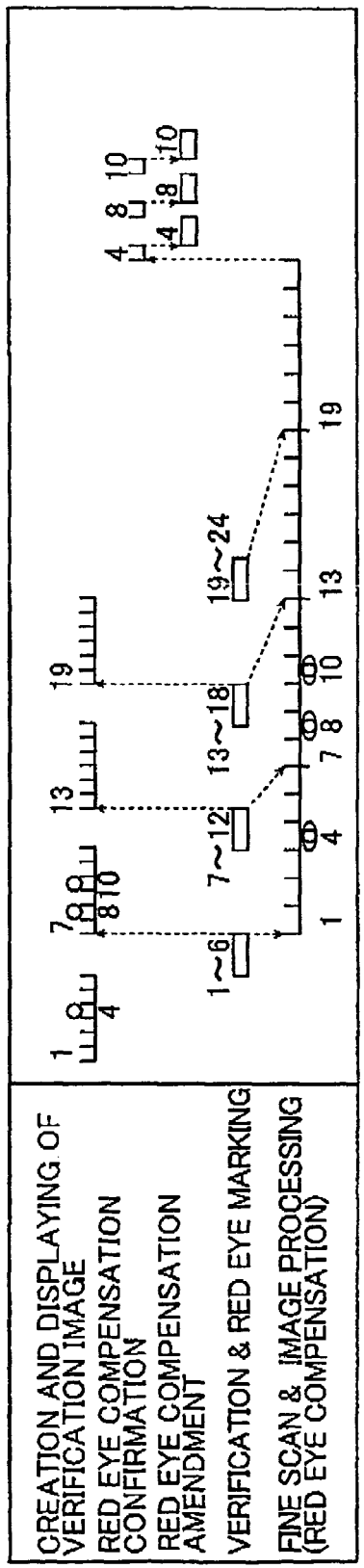
FIGS. 8A and 8B are each a schematic time chart of another example of the operation performed with the image processing method of the present invention.

First, an example of an operation performed in the normal mode of the batch confirmation scheme will be described with reference to FIG. 8A.

In this case, as in the case of the normal mode of the sequential confirmation scheme, the scanner 12 successively performs prescan, starting from the 24$^{th}$ frame and ending in the first frame. Then, the signal processing unit 50 of the image processing apparatus 14a performs image processing on prescanned data of each frame and stores resultant data in the pFM 52.

When the prescanned data of every frame is stored in the pFM 52, the setup unit 58 determines reading conditions for fine scan from the first frame, sets image processing conditions, and sends these conditions to the scanner 12, the verification processing unit 60, and the image processing unit 72.

When image processing conditions are set for the first to sixth frames, the verification processing unit 60 processes the prescanned data of those frames from the first frame to generate verification image data, which is then displayed by the data conversion unit 64 as verification images on the display 18.

When the verification images of the first to sixth frames are displayed, verification and red eye frame marking are performed in the same manner as above. In this example, as in the above case, the fourth frame is marked as a red eye frame.

When the verification of the first to sixth frames is finished, the operator issues an output command, in response to which sequential fine scanning and image processing are performed, starting from the first frame.

Also, if the image processing condition setting is finished, creation and displaying of the verification images of the next group of six frames (seventh frame to the 12$^{th}$ frame) are concurrently started.

As in the above case, when the scanner 12 performs fine scan, the signal processing unit 50 processes the image signal and stores fine scanned data in the fFM 54.

After the fine scanned data is stored in the fFM 54, the image processing unit 72 reads the fine scanned data and performs image processing under the determined image processing conditions. In addition, the image processing unit 72 performs red eye compensation processing on each red eye frame. In this manner, the image processing unit 72 generates output image data.

Here, with the batch confirmation scheme, red eye compensation confirmation is performed on every red eye frame after red eye compensation processing on every red eye frame finished. In this example, after every frame has been subjected to image processing, the red eye compensation confirmation is performed for every red eye frame by one operation.

Accordingly, as to each frame other than the red eye frame, when its image processing is finished, output image data of the frame is sent to the data conversion unit 66. On the other hand, as to each red eye frame, the image processing unit 72 stores output image data of the frame before and after the red eye compensation processing. Also, the data conversion unit 66 sequentially processes the supplied output image data and sends resultant image data to the printer 22.

On the other hand, in parallel with the fine scan and image processing of the first to sixth frames, creation and displaying of verification images of the seventh to 12$^{th}$ frames are performed. At the point in time when the verification images of those six frames are displayed, verification and marking of each red eye frame are performed for the seventh to 12$^{th}$ frames in the same manner as above. In this illustrated example, as in the above case, the eighth and tenth frames are marked.

Here, as already mentioned, with the batch confirmation scheme, the confirmation of each red eye compensation result is performed by one operation, so that regardless of whether red eye compensation processing is performed on any red eye frames, verification of six frames in a group is not suspended and is performed continuously.

When verification of the seventh to 12$^{th}$ frames is finished, creation and displaying of verification images of the 13$^{th}$ to 18$^{th}$ frames are next performed. Then, verification and marking of each red eye frame (no red eye frame exists in this example) are performed after the creation of the verification images of those six frames. Following this, similarly, creation, verification, and the like of verification images of the 19$^{th}$ to 24$^{th}$ frames are performed.

In parallel with those operations, fine scanning and image processing of each frame (red eye compensation processing is also performed for the eighth frame and the tenth frame) are sequentially performed. Then, as to each frame other than the red eye frame, output image data of the frame is sequentially sent to the data conversion unit 66. On the other hand, as to the red eye frame, output image data thereof before and after the red eye compensation processing is stored. Note that, when a long time is taken to perform verification and therefore fine scan catches up the verification, the Line scanning is suspended to wait for the progress of the verification.

When image processing of fine scanned data of the $24^{th}$ frame is finished, the image processing unit 72 sends image data stored therein of the fourth frame before and after the red eye compensation to the data conversion unit 64 corresponding to the display 18.

The data conversion unit 64 displays the red eye compensation screen shown in FIG. 7B described above on the display 18 (no verification screen exists in the background, in this mode). Then, the operator performs red eye compensation confirmation through this red eye compensation screen and makes amendments and the like as necessary. After that, if a result of the red eye compensation is OK (confirmation is completed), the operator pushes the "OK" button.

In response to this operation, the image processing unit 72 sends output image data of the fourth frame having been subjected to the red eye compensation processing to the data conversion unit 66.

After sending the output image data of the fourth frame, the image processing unit 72 next sends image data of the eighth frame to the data conversion unit 64 and the operator confirms a result of its red eye compensation in the same manner. In response to completion of this confirmation, the image processing unit 72 sends output image data of the eighth frame having been subjected to the red eye compensation processing to the data conversion unit 66. Further, the image processing unit 72 performs the same processing on the tenth frame. In this manner, processing of the film F is completed.

Figure 8B:
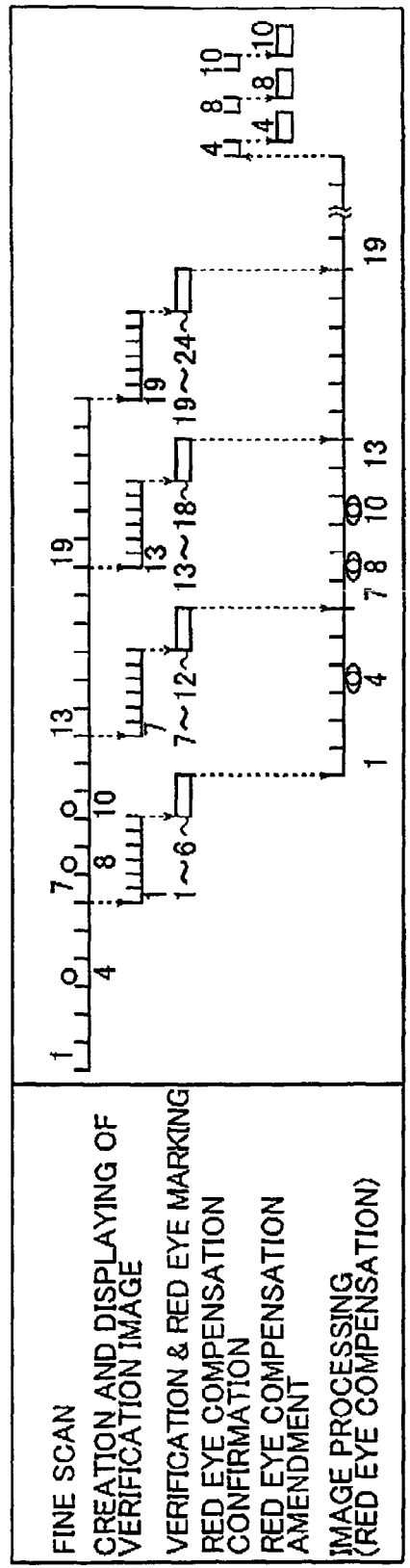

Next, an example of an operation performed in the high-speed mode of the batch confirmation scheme will be described with reference to FIG. 8B.

As in the case of the high-speed mode of the sequential confirmation scheme, in the case of the high-speed mode of the batch confirmation scheme, the scanner 12 continuously performs pre-photometry and fine scanning, starting from the first frame and ending in the $24^{th}$ frame. Then, the signal processing unit 50 creates fine scanned data and prescanned data by processing obtained image signals, with the prescanned data being stored in the pFM 52 and the fine scanned data being stored in the fFM 54.

After the prescanned data is stored in pFM 52, the setup unit 58 reads the prescanned data, determines image processing conditions for each frame, and sets the image processing conditions in the verification processing unit 60 and the image processing unit 72.

When the fine scanning and the setting of the image processing conditions for the first group of six frames (first to sixth frames) are finished, the verification processing unit 60 performs image processing to generate verification image data, which is then sent to the data conversion unit 64 and is displayed as verification images.

As in the above example, when the verification images of the six frames are displayed, the operator performs verification for the first to sixth frames and marks each red eye frame (fourth frame is marked as in the above example).

When verification of the first to sixth frames is finished and an output command is issued, the image processing unit 72 reads the fine scanned data of the first to sixth frames and performs image processing, and optically, further red eye compensation processing on the read fine scanned data.

It should be noted here that, as in the above case of the normal mode, in the high-speed mode of the batch confirmation scheme, the red eye compensation confirmation of every red eye frame is performed by one operation after image processing of every frame is finished. Therefore, the image processing unit 72 sends output image data of each frame other than the red eye frame to the data conversion unit 66 and stores image data of the red eye frame before and after the red eye compensation processing.

Further, at the point in time when verification of a preceding group of six frames is finished and fine scanning of the next group of six frames (seventh frame to $12^{th}$ frame) is finished, verification images of the seventh frame to $12^{th}$ frame are created and displayed. When the verification images of those six frames are displayed, verification and marking of each red eye frame for those six frames (the eighth frame and the tenth frame are marked similarly) are performed.

In parallel with those operations, image processing of the first to sixth frames is performed. As already mentioned, however, with the batch confirmation scheme, confirmation of each red eye compensation result is performed lastly, so that regardless of whether red eye compensation processing is performed on any red eye frame, verification will never be suspended and is continued until all of the six frames are verified.

When outputting of output image data of the first to sixth frames is finished and verification of the seventh to $12^{th}$ frames is finished, the image processing unit 72 starts image processing of fine scanned data of the seventh to $12^{th}$ frames, starting from the seventh frame.

On the other hand, when the verification of the seventh to $12^{th}$ frames is finished and fine scan of the $13^{th}$ to $18^{th}$ frames is finished, verification images of the $13^{th}$ to $18^{th}$ frames are created. Then, verification of those images and marking of each red eye frame are performed through a screen in which the verification images of the $13^{th}$ to $18^{th}$ frames are displayed (no red eye frame exists in this example).

Following this, when outputting of output image data of the seventh to $12^{th}$ frames is finished and verification of the $13^{th}$ to $18^{th}$ frames is finished, the image processing unit 72 starts image processing of fine scanned data of the seventh to $13^{th}$ frames, starting from the $13^{th}$ frame.

On the other hand, when the verification of the $_{13}$ μl to $18^{th}$ frames is finished and fine scan of the $19^{th}$ to $24^{th}$ frames is finished, verification images begin to be created from $19^{th}$ frame. Following this, the same processing is performed up to outputting of output image data of the $24^{th}$ frame to the data conversion unit 66.

When image processing of fine scanned data of the $24^{th}$ frame is finished, the image processing unit 72 sends the stored image data of the fourth frame before and after the red eye compensation to the data conversion unit 64 corresponding to the display 18. Following this, as in the case of the normal mode described above, a result of the red eye compensation of the fourth frame is confirmed. In response to completion of this confirmation, the image processing unit 72 sends output image data of the fourth frame having been subjected to the red eye compensation processing to the data conversion unit 66. Further, the image processing unit 72 sequentially performs the same processing on the eighth frame and the tenth frame. In this manner, processing of the film F is completed.

With the batch confirmation scheme, the order, in which the printer 22 creates prints, differs from the order of the frame numbers. In order to circumvent this inconvenience situation, output image data of frames other than red eye frames may be stored anywhere, and after red eye compensation confirmation of the red eye frames is finished, the printer 22 may create prints in the order of the frame numbers.

When the prime importance is placed on productivity, it is preferable that prints of output image data are instantaneously created in defiance of the frame numbers. On the other hand, when the prime importance is place on workability after printing, it is preferable that the output image data is stored and prints are created in the order of the frame numbers. Also, one of those may be selected with reference to required performance and the like of the photoprinter. Further, for instance, a productivity mode and a workability mode may be prepared as selectable in the photoprinter.

As is apparent from the above description, with the four image processing methods according to the second aspect of the present invention (the normal mode and the high-speed mode of the sequential confirmation scheme and the normal mode and the high-speed mode of the batch confirmation scheme), when prints are created with a digital photoprinter, each red eye frame, for which red eye correction should be performed, is designated concurrently with verification. Then, red eye compensation processing as well as image processing are performed on the red eye frame and a result of the red eye compensation is confirmed. As a result, according to the present invention, it becomes possible to perform red eye compensation processing in a digital photoprinter by performing almost the same manipulations and operations as in the case of a conventional process of printing with film processing. That is, according to the present invention, a red eye compensation function is incorporated into the process of printing with film processing, which makes it possible to create high-quality prints having no red eye problem with satisfactory productivity.

It should be noted here that the image processing method of the second aspect of the present invention is not limited to the above examples. For instance, in the illustrated example, as a preferable example, an image after red eye compensation processing as well as an image before the red eye compensation processing are displayed in a red eye compensation confirmation screen. However, the present invention is not limited to this and only the image having been subjected to the red eye compensation processing may be displayed and a red eye compensation result may be confirmed.

Further, in the illustrated example, in the case of the batch confirmation scheme, every red eye compensation result is confirmed through a screen displayed on a display after processing of every frame is finished. However, the present invention is not limited to this and the red eye compensation confirmation may be performed on every red eye frame at the point in time when red eye compensation processing of every red eye frame is finished.

Also, in the illustrated example, in the case of the batch confirmation scheme, the red eye compensation confirmation is performed by displaying frames one by one. However, the present invention is not limited to this and the red eye compensation confirmation may be performed by displaying red eye compensation results of multiple frames or every frame at a time.

Further, the image processing method of the present invention may be implemented by setting the sequential confirmation scheme and the batch confirmation scheme as selectable.

Furthermore, in the illustrated example, only images (prints or image files) having been subjected to red eye compensation are outputted. However, the present invention is not limited to this and two kinds of images that are images having been subjected to red eye compensation and images not having been subjected to the red eye compensation may be outputted.

As is described above, according to a second aspect of the present invention, it is possible to perform print creation including red eye compensation processing with favorable operability and productivity in a so-called process of printing with film processing in print creation in which a digital photoprinter is used. The image processing method of the second aspect of the present invention is basically constructed in the manner described above.

Then, with reference to FIGS. 9 to 12, described below are a red eye compensation method according to a first embodiment of a third aspect, an image processing method according to a second embodiment of the third aspect, a printing method according to a third embodiment and a printer according to a forth embodiment of the third aspect of the present invention. Particularly, a printer with a preprocessing function and a direct printer will be described.

Third Aspect

Firstly, a red eye compensation method according to the first embodiment of the third aspect of the present invention will be described with reference to FIG. 9.

Figure 9:
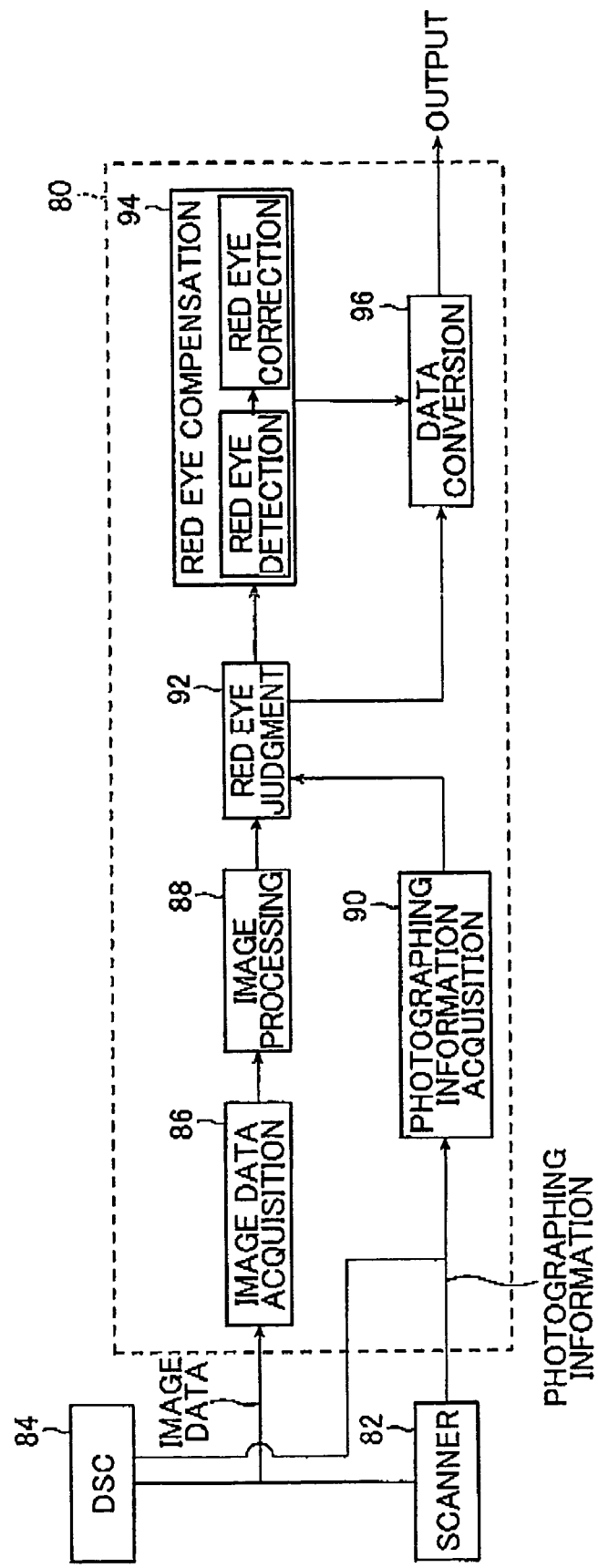
FIG. 9 is a block diagram of still another example of the image processing apparatus that implements another red eye compensation method of the present invention.

FIG. 9 is a block diagram of an example of an image processing apparatus that implements an example of the red eye compensation method according to the first embodiment of the third aspect of the present invention. Note that the image processing apparatus 80 shown in FIG. 9 is capable of being used in the digital photoprinter 10 shown in FIG. 1 in place of the image processing apparatus 14. Needless to say, however, the present invention is not limited to this.

The image processing apparatus 80 shown in FIG. 9 receives image data of optically photographed images (photographed images) from a scanner 82 or a digital (still) camera 84 (hereinafter referred to as a "DSC 84"). The image processing apparatus 80 then performs image processing on this image data and outputs resultant image data as image data to be used to output (photographic) prints or image data (image files) to be recorded on a recording medium such as a CD-R. The image processing apparatus 80 basically includes an image data acquisition unit 86, an image processing unit 88, a photographing information acquisition unit 90, a red eye judgment unit 92, a red eye compensation unit 94, and a data conversion unit 96.

The scanner 82 and the image processing apparatus 80 constitute the aforementioned input machine of a digital photoprinter, for instance. With the scanner 82 and the image processing apparatus 80, images photographed on a film are photoelectrically captured, predetermined image processing is performed on the captured images to generate image data for outputting, and this image data is outputted to the aforementioned output machine of the digital photoprinter, a recording apparatus for recording the image data on a recording medium such as a CD-R (for instance, a digital image data input/output machine connected to the digital photoprinter (such as "Digital Imaging Controller F15" manufactured by Fuji Photo Film Co., Ltd.)), and the like.

Also, connected to the image processing apparatus 80 are a mouse and a keyboard for performing various manipulations and a display for displaying verification images and various manipulative commands.

Further, the image processing apparatus 80 constituting the input machine of the digital photoprinter includes a unit that analyzes prescanned data obtained by the scanner 82 and sets reading conditions for fine scan by the scanner 82, and an image data processing system for displaying verification images on the display.

The image data acquisition unit 86 acquires image signals of images captured by the scanner 82 or image data of images photographed with the DSC 84 or the like, performs necessary processing on the image signals or the image data, and sends a resultant image signal or data to the image processing unit 88.

Usually, the image data of the images photographed with the DSC 84 is recorded on a recording medium (a memory card), such as a SmartMedia™ card and CompactFlash™ card, loaded into the DSC 84 or the like.

This card-type recording medium is loaded in a card slot as a reading unit (a drive such as digital image data input/output machine described above (not shown), for instance) connected to the image processing apparatus 80 for reading the data from the recording medium. Then, the image data is read from the loaded recording medium, or the image data is read from the recording medium in the DSC 84 which is connected to an external input terminal of the image processing apparatus 80 with a specialized cable, and thereby the image data of the images photographed with the DSC 84 is acquired by the image data acquisition unit 86.

Figure 2:
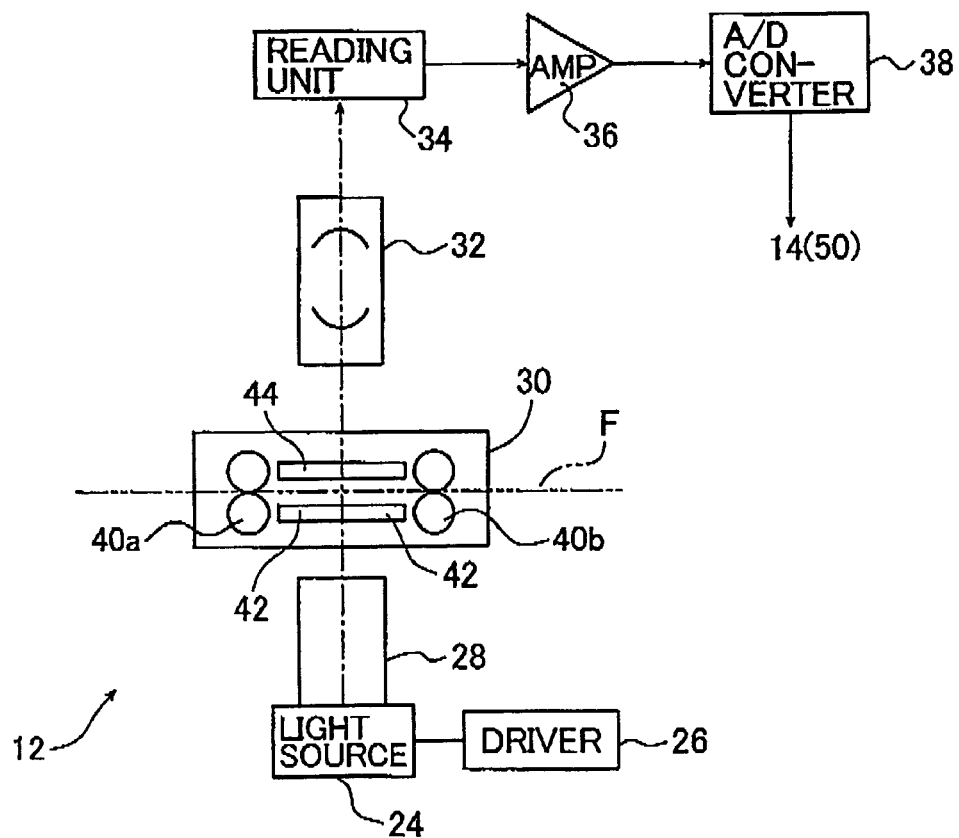
FIG. 2 is a conceptual diagram of an example of a scanner of the digital photoprinter shown in FIG. 1.

The scanner 82 photoelectrically captures images photographed on a (photographic) film and examples thereof include the scanner 12 shown in FIG. 2 and the like. Note that, in the scanner 82 used in this aspect, the image capturing method is not limited to this and it is possible to use any other known methods such as image capturing through slit scan.

The scanner 82 amplifies an output signal from an area CCD sensor, converts the amplified output signal into a digital image signal using an A/D converter, and outputs the digital image signal to the image data acquisition unit 86.

On receiving the digital image signal from the scanner 82, the image data acquisition unit 86 performs various corrections, such as dark correction, DC offset correction, and shading correction on the image signal. The image data acquisition unit 86 then subjects a resultant image signal to Log conversion to generate image (density) data, and supplies the data to the image processing unit 88. Also, when receiving image data from the DSC 84, the image data acquisition unit 86 converts the image data into image data in a format adapted to the image processing apparatus 80 as necessary, and then sends the resultant image data to the image processing unit 88 (this conversion may be performed by the recording medium reading unit (a drive)). It is sufficient that those operations are performed with a known unit.

In the image data acquisition unit 86, a variety of image data supplied from various image data sources is preferably set up beforehand so as to be suitable for processing in the image processing apparatus 80.

Further, the image data acquisition unit 86 may store the image data in a frame memory or the like as necessary.

Here, in the present invention, photographing information is added to (photographed) images.

As will be described later, the photographing information is information with reference to which it is judged whether or not there is a possibility of occurrence of red eyes in the images (frames), and examples thereof include flash information, an Ev value, a shutter speed, a stop value, a photographing mode, a camera type, lens information, a distance between a subject and a camera, a photographing time or a photographing duration, and other Exif information.

In the case of images photographed with the DSC 84, it is sufficient that the photographing information is added to image files in which image data of the images is recorded.

For instance, in many cases, the DSC 84 outputs images as image files in an Exif format, so that it is sufficient that the photographing information is recorded as Exif information on Exif tags.

When the photographing information is recorded on an APS (Advanced Photo System) film or on a cartridge film with IC tags, it is sufficient that the photographing information is magnetically recorded on the film for each frame using a magnetic recording medium of the film or IC tags of the cartridge and a magnetic recording unit possessed by a camera.

Further, in the case of a film other than the APS film, it is possible to use a method with which, for instance, an optical recording unit is provided for a camera and the photographing information is optically recorded for each frame in areas other than frame (image) areas of the film.

The photographing information added by the DSC 84 to the images is read by the recording medium reading unit described above along with the image data and is sent to the photographing information acquisition unit 90.

On the other hand, in the present invention, the scanner 82 includes a reading unit that reads the photographing information from a film, and sends the read photographing information to the photographing information acquisition unit 90. In the case of an APS film or a cartridge film with IC tags, for instance, a unit that reads magnetic information from the film loaded or the like into the scanner (film carrier) may be used. On the other hand, even in the case of the photographing information optically recorded on a film other than the APS film in the manner described above, the photographing information may be read with a known optical reading unit provided for the scanner (film carrier).

The image processing unit 88 is a portion for performing predetermined image processing on image data sent from the image data acquisition unit 86.

The image processing performed in the image processing unit 88 is not specifically limited and examples thereof include electronic scaling processing (enlargement/reduction processing), gradation conversion, color/density correction, sharpness processing, dodging processing (processing for compressing the dynamic range of image density), and the like. Also, it is sufficient that those image processing is performed with known methods.

The image data processed by the image processing unit 88 and the photographing information acquired by the photographing information acquisition unit 90 described above are both sent to the red eye judgment unit 92.

The red eye judgment unit 92 is a portion for judging whether or not there is a possibility of occurrence of red eyes in images (frames) using the photographing information. In the image processing apparatus 80, the image data of each image judged by the red eye judgment unit 92 as having a possibility of red eye occurrence is subjected to red eye compensation processing to be described later in the red eye compensation unit 94 before being sent to the data conversion unit 96. On the other hand, image data of each image judged as not having the possibility of red eye occurrence is directly sent to the data conversion unit 96 without being subjected to the red eye compensation processing.

That is, with the red eye compensation method according to the third aspect of the present invention, the photographing information is added to images (image data), it is judged whether or not there is a possibility of red eye occurrence in the images using the photographing information, and only images having the possibility of red eye occurrence are subjected to red eye compensation processing. In other words, the number of images to be subjected to the red eye compensation processing is reduced using the photographing information, thereby improving efficiency of the red eye compensation processing.

Therefore, according to the third aspect of the present invention, at the time when full-automatic red eye compensation or the like is performed in the digital photoprinter described above, it becomes possible to skip the red eye compensation processing on images that do not require the red eye compensation processing, such as images photographed without the aid of an electronic flash and therefore having no possibility of red eye occurrence. As a result, it becomes possible to improve efficiency of the red eye compensation processing, to significantly reduce a processing time, and to markedly improve productivity. Further, it is possible to eliminate wasted time by skipping unnecessary red eye compensation processing and to use the saved time for required red eye compensation processing as necessary. As a result, it becomes possible to improve the accuracy of red eye detection and red eye compensation and to perform more favorable red eye compensation processing.

As described above, examples of the photographing information includes flash information, an Ev value, a photographing mode, a camera type, a photographing duration, as well as a shutter speed, a stop value, lens information, a distance between a subject and a camera, a photographing time and other Exif information. The photographing information is not limited to the above and can be any information recorded when photographing. In case a DSC is used, the photographing information is preferably Exif information such as information with respect to a photographing condition or to a photographed scene.

Here, the flash information refers to information showing whether or not images were photographed with the aid of an electronic flash (whether or not flash photographing was performed). The red eye problem occurs only at the time of flash photographing, so that by utilizing this flash information, it becomes possible to remove each image photographed without the aid of the electronic flash and therefore having no possibility of red eye occurrence from the target of the red eye compensation processing.

The Ev (Exposure Value) value (=exposure value) is a known value that is determined with reference to ISO 100 films and is regulated so that this value becomes Ev0 at the time when a stop value is set at f1 and a shutter speed is set at one second, becomes Ev1 when the brightness is increased and therefore the shutter speed is changed by one step or the stop value is changed by one step, and becomes Ev2 when the brightness is further increased and therefore the shutter speed is changed by two steps or the stop value is changed by two steps. That is, as the Ev value is increased, the exposure amount is decreased.

Usually, as the exposure amount is increased, that is, as the Ev value is decreased, the possibility of red eye occurrence is increased, so that it is possible to estimate the possibility of red eye occurrence with reference to the Ev value.

It should be noted here that it is not limited to the direct addition of the Ev value as the photographing information in this aspect, and the stop value and shutter speed (or information corresponding to those parameters) at the time of photographing may be added to images as the Ev value.

In many ordinary cameras, photographing conditions suited for various photographing scenes are prepared as a portrait mode, a landscape mode, a night scene mode, and the like, from among which a photographer can select a photographing mode.

Here, the red eye problem most easily occurs in the portrait mode, and in many cases, light emission by an electronic flash is prohibited in the landscape mode. Accordingly, it is possible to discriminate photographed scenes and the like with reference to the photographing mode and to estimate the possibility of red eye occurrence based on a result of this discrimination.

The camera type refers to information showing the type of a camera used to photograph images.

In recent years, there is a tendency that the sizes of cameras are reduced (in particular, in the case of DSC 84) and therefore the distance between a lens and an electronic flash is reduced. As a result, electronic flash light reflected by retinas easily enters into the lens and therefore the red eye problem easily occurs. That is, cameras are classified into cameras, with which the red eye problem easily occurs, and cameras with which the red eye problem hardly occurs. As a result, it is possible to estimate the possibility of red eye occurrence with reference to the camera type information.

Further, the photographing duration or time refers to information showing a duration for photographing images or a time at which images were photographed.

As a matter of course, when flash photographing is performed at nighttime, the red eye problem easily occurs. Therefore, it is possible to estimate the possibility of red eye occurrence using this photographing duration or time information.

In addition, it is also possible to estimate the possibility of red eye occurrence when a distance between a subject and a camera is so small that the reflected flash light easily enters into the lens and, hence, the red eye problem easily occurs. Furthermore, lens information and other Exif information may be used to judge a red eye occurrence. In such cases, it is of course necessary to determine the relation between such information and the red eye occurrence possibility beforehand.

The red eye judgment unit 92 judges the possibility of red eye occurrence in images with reference to at least one kind of the photographing information added to the images, sends image data of each image having the possibility of red eye occurrence to the red eye compensation unit 94, and sends image data of each image having no possibility of red eye occurrence to the data conversion unit 96.

For instance, it is possible to use a method with which when the flash information is added as the photographing information, images photographed without the aid of an electronic flash does not have the red eye occurrence possibility and therefore the image data of those images is sent to the data conversion unit 96. On the other hand, image data of other images is sent to the red eye compensation unit 94.

Here, the red eye problem does not necessarily occur at the time of flash photographing and many of images photographed using an electronic flash have no red eye problem. In view of this situation, the flash information may be appropriately combined with another kind of photographing information such as the Ev value, the photographing mode, the camera type information, and the photographing time. In this case, it becomes possible to judge the red eye occurrence possibility with higher accuracy. That is, it becomes possible to perform more accurate judgment using these information as weights.

For instance, according to studies conducted by the inventors of the present invention, although depending on the sensitivity of a film used, when the Ev value is equal to or less than 10, there exists a possibility of occurrence of the red eye problem. Accordingly, each image photographed using an electronic flash and having an Ev value equal to or less than 10 may be judged as an image having the red eye occurrence possibility and sent to the red eye compensation unit 94 while sending other images to the data conversion unit 96.

It should be noted here that, needless to say, in this aspect, it is preferable that the photographing information contains the flash information. However, the present invention is not limited to this, and for instance, the red eye occurrence possibility may be judged using a combination of the Ev value and the camera type. Alternatively, the red eye occurrence possibility may be judged based on the Ev value, the camera type, and the photographing mode.

Further, in the red eye judgment unit 92, the judgment criteria may be changed as appropriate in accordance with supplied photographing information.

The flash information, for instance, is used to judge whether the flash was used or not. In case judged as that the flash was used, each of the photographing information which is used to judge the red eye occurrence except the flash information may be weighted in accordance with the possibility of red eye occurrence, and by comparing a weighted value with the predetermined threshold, the possibility of red eye occurrence may be judged with the improved accuracy. Alternatively, each of the photographing information including the flash information may be weighted in accordance with the possibility of red eye occurrence, and the weighed value may be compared with the predetermined threshold to thereby judge the possibility of red eye occurrence.

Here, a weighting value corresponding to each of the photographing information, a threshold used to judge that a red eye problem exists and the like may be suitably set statistically from a number of samples.

The red eye judgment unit 92 sends image data of each image judged in the manner described above as having the red eye occurrence possibility to the red eye compensation unit 94.

The red eye compensation unit 94 is a portion for performing red eye compensation processing, and for instance, detects pupils colored in red (red eye detection) from the supplied image data and performs correction of the detected pupils (red eye correction).

It should be noted here that a method of performing the red eye detection and the red eye correction in the red eye compensation unit 94 may be the same as that used in the red eye compensation unit 70 shown in FIG. 3 to perform red eye detection and red eye correction. Also, when performing the red eye correction, the aforementioned various kinds of photographing information may be used.

It should be noted here that the red eye compensation processing in the red eye compensation unit 94 of this aspect is not limited to the example described above and it is possible to use any other known methods as in the case of the red eye compensation processing performed in the red eye compensation unit 70 shown in FIG. 3.

The red eye compensation unit 94 sends image data having been subjected to the red eye correction to the data conversion unit 96. Also, as described above, the red eye judgment unit 92 sends image data of each image judged as having no possibility of red eye occurrence directly to the data conversion unit 96.

The image processing apparatus 80 shown in FIG. 9 judges the possibility of red eye occurrence with the red eye judgment unit 92 as well as detects and corrects a red eye with the red eye compensation unit 94 after performing a normal image processing with the image processing unit 88. However, the present invention is not limited to this example. Conversely, the image processing with the image processing unit 88 may be performed after judging the possibility of red eye occurrence with the red eye judgment unit 92 and detecting and correcting a red eye with the red eye compensation unit 94. Or, judgment of the possibility of red eye with the red eye judgment unit 92 may be first performed, the image processing with the image processing unit 88 may subsequently follow and, lastly, a red eye detection and correction with the red eye compensation unit may be performed. In either case, an image data to be subjected to the judgment of the possibility of red eye needs to be an image data being set up.

The data conversion unit 96 converts the supplied image data into image data suited for a designated output destination using a three-dimensional lookup table or the like, for instance. Then, the data conversion unit 96 sends the resultant image data to the output destination. For instance, the data conversion unit 96 converts the supplied image data into image data suited for image recording (exposure of a light-sensitive material (photographic paper)) in the output machine of the digital photoprinter described above, and sends the resultant image data to the printer (not shown) of the output machine. Alternatively, the data conversion unit 96 converts the supplied image data into image files in a predetermined format such as a JPEG (Joint Photographic Expert Group) format and sends the image files to a recording apparatus (digital image data input/output machine described above, for instance) that records the image files on a CD-R or the like.

The image processing apparatus for implementing the red eye compensation method according to the third aspect of the present invention is basically configured as described above. The operation of the image processing apparatus and the full-automatic red eye compensation method implemented in the image processing apparatus will be described below.

Figure 10:
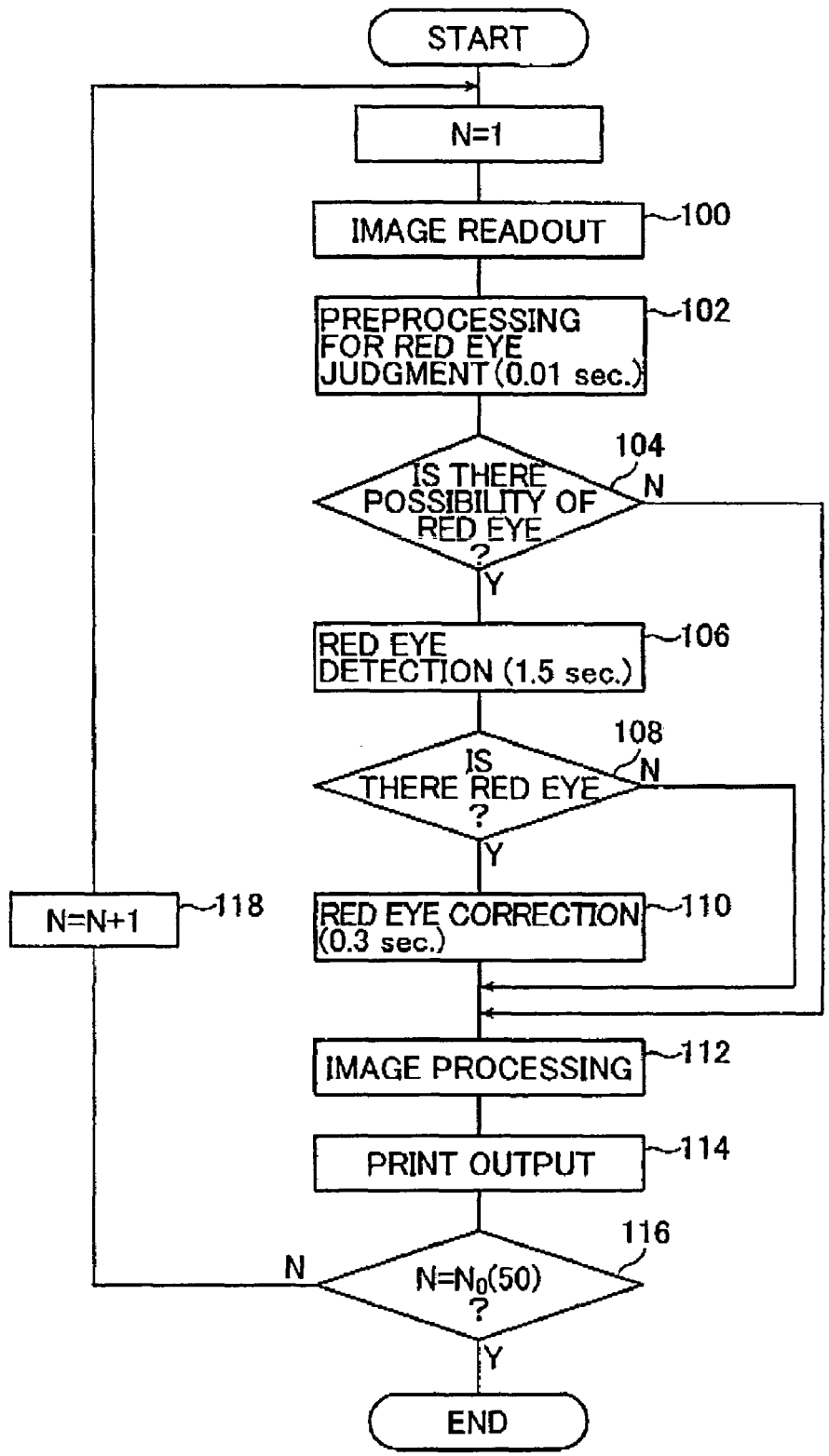
FIG. 10 is a flowchart showing an example of the red eye compensation method of the present invention.

FIG. 10 shows an example of a flowchart of the full-automatic red eye compensation method implemented in the image processing apparatus. It should be noted here that the full-automatic red eye compensation method shown in FIG. 10 is an example in which the red eye judgment by the red eye judgment unit 92 as well as the red eye detection and the red eye correction by the red eye compensation unit 94 are performed prior to the usual image processing by the image processing unit 88 unlike the configuration of the image processing apparatus 80 shown in FIG. 9.

Figure 13:
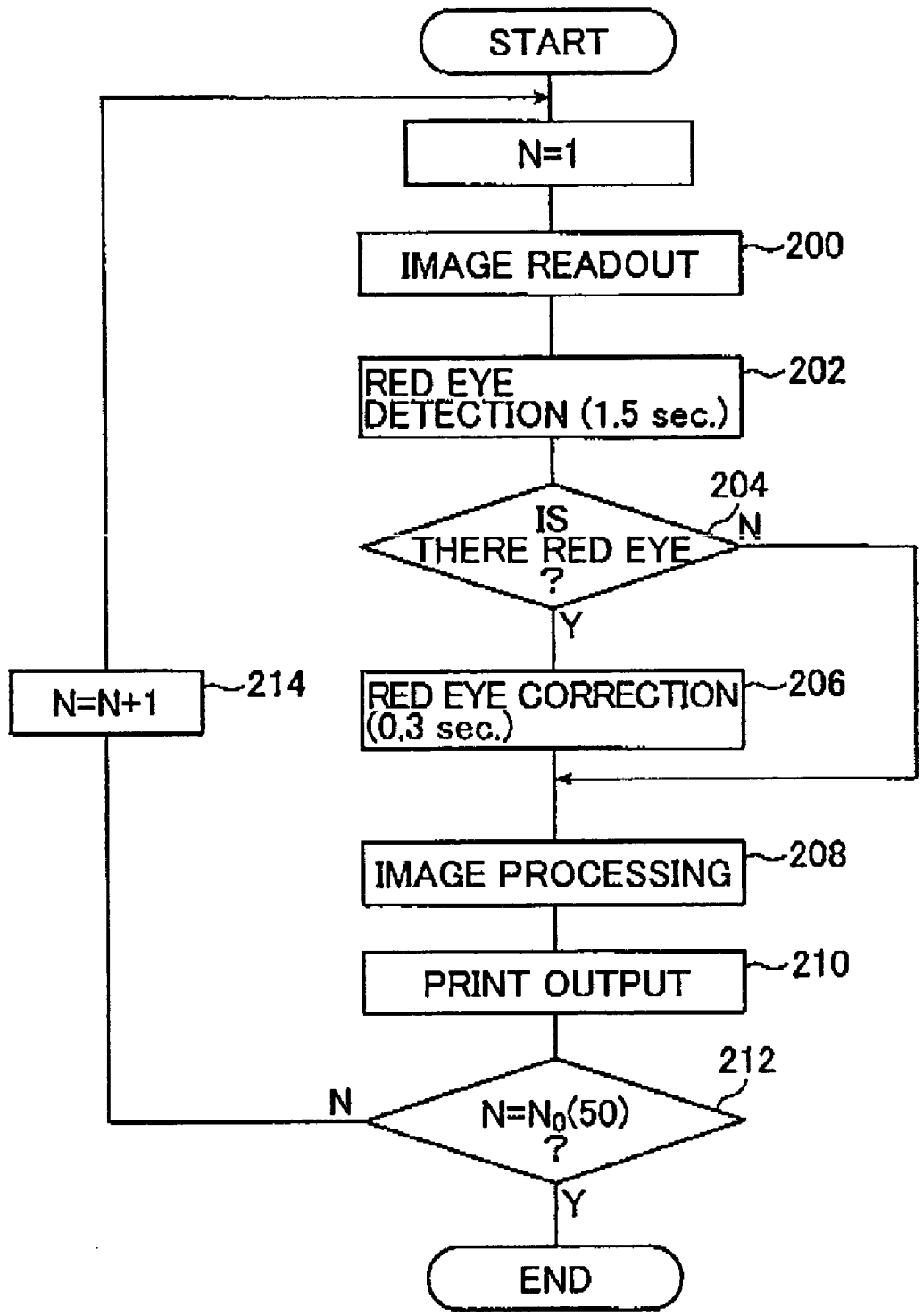
FIG. 13 is a flowchart showing a conventional red eye compensation method.

The full-automatic red eye compensation method according to the third aspect of the present invention as shown in FIG. 10 starts at the number of frame to be processed (N) of 1 as in the conventional method shown in FIG. 13. In Step 100, image data of a frame image to be processed is read out from an image data supply source such as the digital camera (DSC) 84, a recording medium or the scanner 82 (see the acquisition of image data by the image data acquisition unit 86 of the image processing apparatus 80 shown in FIG. 9).

Then, in Step 102, photographing information added to the image data of the frame being processed is used to perform preprocessing for judging whether or not there is a possibility that a red eye phenomenon occurs in the frame image being processed (see the red eye judgment by the red eye judgment unit 92). Thereafter, in Step 104, whether there is a possibility of red eye phenomenon is judged based on the result obtained by the preprocessing in Step 102. When it is judged that there is a possibility of red eye phenomenon, the compensation method proceeds to next Step 106. When it is judged that there is no possibility of red eye phenomenon, the compensation method proceeds to Step 112.

Subsequently, in Step 106, the image data of the frame being processed is analyzed to detect a red eye phenomenon (see the red eye detection by the red eye compensation unit 94). Then, in Step 108, it is judged whether or not there is a possibility of red eye phenomenon based on the result obtained by the red eye detection in Step 106. When a red eye phenomenon is detected (when it is judged that there is a red eye phenomenon), the compensation method proceeds to next Step 110. When no red eye phenomenon is detected (when it is judged that there is no red eye phenomenon), the method proceeds to Step 112.

Subsequently, in Step 110, the frame image being processed on which the red eye phenomenon was detected in Step 106 is subject to color conversion of red eye pupils, thereby correcting the red eye phenomenon (see the red eye correction by the red eye compensation unit 94).

Next, in Step 112, the image whose red eye phenomenon was corrected in Step 110, the image that was judged to have no red eye phenomenon in Step 108, and the image that was judged to have no possibility of red eye phenomenon in Step 104 are subjected to usual image processing such as color/density correction or image structure processing (sharpening) (see the image processing by the image processing unit 88).

Output image data after the image processing has been performed is thus obtained. In Step 114, a print is outputted for an image reproduced from the output image data (see the processing in the data conversion unit 96 and the subsequent processing).

Thereafter, in Step 116, it is judged whether the number of the processed frame N is less than the number of frames to be processed for one case (one processing unit) $N_0$, for example 50 as in the conventional case shown in FIG. 13 (whether $N \geq N_0$ (50)). When N is less than $N_0$ (N is less than 50 for example), in Step 118, the number of the processed frame N is incremented by 1 (N=N+1) and the method returns to the image readout step in Step 100. The full-automatic red eye compensation method including the red eye judgment, red eye compensation (detection and correction), image processing and print output is repeatedly performed until N reaches $N_0$ (50) and the method is finished at the time N has reached $N_0$ (50).

In order to compare the full-automatic red eye compensation method according to this aspect with the conventional full-automatic red eye compensation method shown in FIG. 13 when the present method is used to perform print output for all images ($N_0$=50), it is assumed that, in a usual digital photoprinter, the red eye detection in Step 106 requires about 1.5 seconds/frame and the red eye correction in Step 110 about 0.3 second/frame as in the conventional method. On the other hand, it is assumed that the preprocessing for the red eye judgment in Step 102 requires about 0.01 second (10 milliseconds) per frame, since whether there is a possibility of red eye phenomenon is judged from the photographing information and in particular the flash information. In order to compare this method with the conventional method as described above, it is also assumed that 15 frame images corresponding to 30% of 50 frame images may have a possibility of red eye phenomenon and that 9 frame images corresponding to 60% of the 15 frame images has a red eye phenomenon.

In the full-automatic red eye compensation method according to this aspect, the red eye judgment is first applied to all images (50 images). Therefore, the red eye judgment step requires 0.5 second (50 frames×0.01 second=0.5 second).

Next, since 15 frames are judged to have a possibility of red eye phenomenon as a result of the red eye judgment and the red eye detection is applied to these 15 frames, the red eye detection step requires 22.5 seconds (15 frames×1.5 seconds=22.5 seconds).

In the red eye detection step, a red eye phenomenon is found in 9 frames among the 15 frames and the red eye correction is applied to the 9 frames. Therefore, the red eye correction step requires 2.7 seconds (9 frames×0.3 second=2.7 seconds).

Therefore, when the processing is performed according to the inventive method shown in FIG. 10, the total time required for these processing steps is 25.7 seconds (0.5+22.5+2.7=25.7).

As described above, the full-automatic red eye compensation method according to the third aspect of the present invention requires about 25.7 seconds for processing, and the processing time can be significantly reduced to about one third compared with the processing time of about 77.7 seconds in the conventional full-automatic red eye compensation method as described above. Note that the reduction effect is larger when all the frame images are judged to have no possibility of red eye phenomenon as a result of the red eye judgment, since the time required for the processing by the inventive method is only 0.5 second in the case of 50 frames. On the other hand, when all the frame images are judged to have a possibility of red eye phenomenon as a result of the red eye judgment, the inventive method requires more time by 0.5 second than the conventional method. However, the probability of such a case is very low and the time additionally required for the processing is only 0.5 second. Therefore, it can be understood that the reduction effect obtained in other cases than the case where all the frames are judged to have a possibility of red eye phenomenon is much more advantageous.

The image is only compensated for the red eye phenomenon in various examples of the red eye compensation method according to the first embodiment of the third aspect of the present invention as described above. However, this is not the sole case of the present invention and the image may be compensated for specified image quality deterioration including a defect in eyes of a subject (e.g., gold eye) as in the image processing method according to the second embodiment of the third aspect of the present invention. Alternatively, the image may be compensated for specified image quality deterioration due to a photographing lens used, such as aberrations (e.g., distortion, lateral chromatic aberration, deterioration of marginal luminosity and defocusing). In these cases, at least one of various photographing information described above, more specifically, at least one of Exif information, in particular lens information including lens characteristics, a camera type, and further a distance between a camera and a subject, a shutter speed, a stop value and a photographing mode can be used for the verification of the specified deterioration in image quality. Occurrence of aberrations depends on the photographing information including the lens information, the distance between a camera and a subject and the stop value. Therefore, it is preferable to judge whether there is a possibility of occurrence of aberrations mainly based on the photographing information described above.

In the case described above, the red eye compensation method and the image processing method according to the third aspect of the present invention are implemented in an image processing apparatus constituting a digital photoprinter. However, this is not the sole case of the present invention. Aside from this, the red eye compensation method and the image processing method may be performed in an image processing section in a personal computer capable of image processing or in a printer capable of print output. Alternatively, these methods may be performed in an image processing section in a direct printer where image data from a digital camera or a recording medium such as a memory card used therein can be directly outputted as a print, without being read out on a personal computer. Further, these methods may be performed in a digital pickup device as in the interior of a digital camera.

In addition, the red eye compensation method according to the first embodiment of the third aspect of the present invention and the image processing method according to the second embodiment of the third aspect of the present invention can also be implemented as a printing method according to the third embodiment of the third aspect of the present invention to which the red eye compensation method and the image processing method are applied. This printing method can be applied not only to the digital photoprinter as described above but also to a direct printer and various other types of printers capable of print output.

Figure 11:
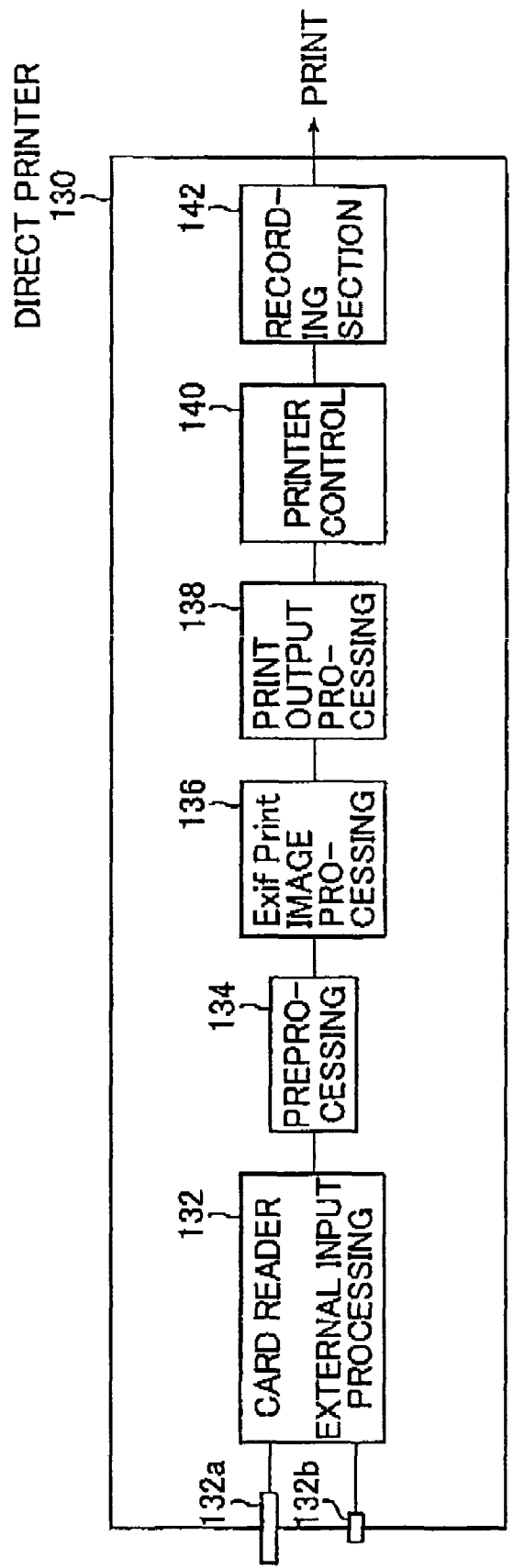
FIG. 11 is a block diagram showing an example of a direct printer having a preprocessing function according to the present invention.

FIG. 11 is a block diagram showing an example of a direct printer according to the fourth embodiment of the third aspect of the present invention to which the printing method according to the third embodiment of the third aspect of the present invention is applied and which has a preprocessing function. Note that FIG. 11 is mainly focused on the image data processing in the direct printer.

As shown, a direct printer 130 comprises a card slot 132a, an external input terminal 132b, an image data acquiring section 132, a preprocessing section 134, an image processing section 136, a print output processing section 138, a printer controlling section 140 and a recording section 142.

Figure 14:
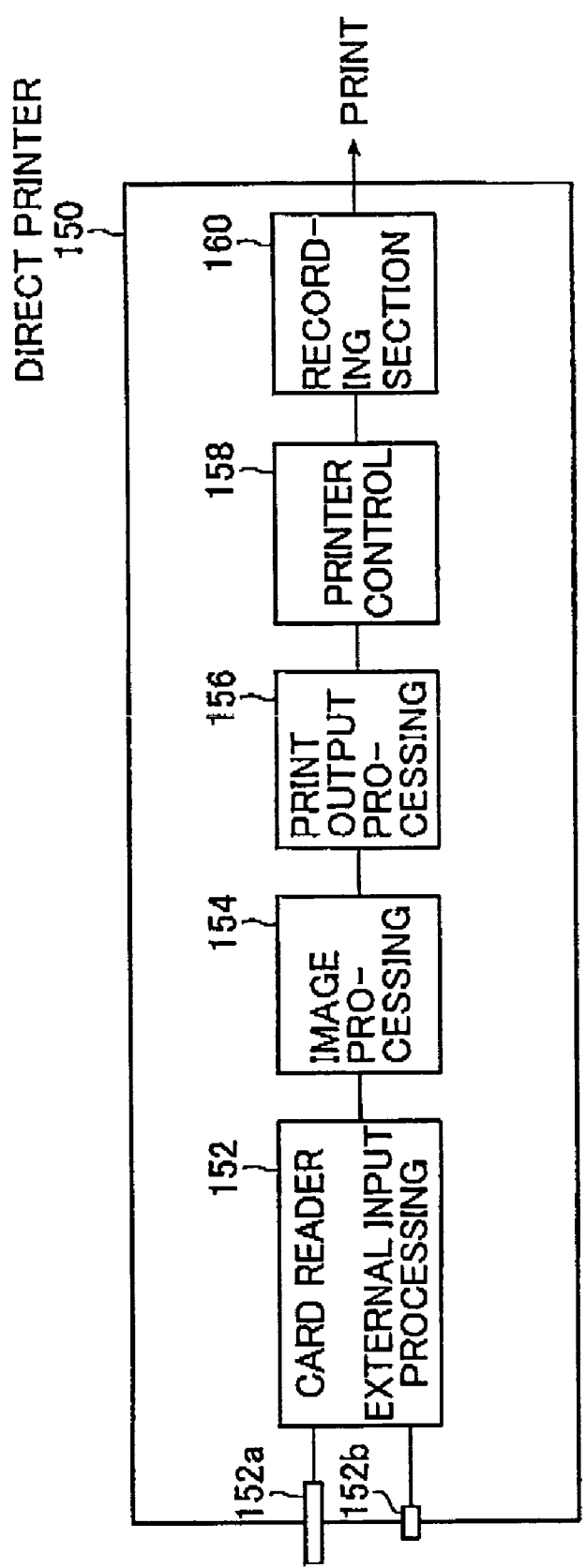
FIG. 14 is a block diagram of a conventional direct printer.

The card slot 132a, the external input terminal 132b, the image data acquiring Section 132, the print output processing section 138, the printer controlling section 140 and the recording section 142 used in the direct printer 130 shown in FIG. 11 may be similar in configuration to the card slot 152a, the external input terminal 152b, the image data acquiring section 152, the print output processing section 156, the printer controlling section 158 and the recording unit 160 used in the direct printer 150 shown in FIG. 14.

The card slot 132a is used to insert therein a card type image data supply source such as a memory card in a digital camera or another recording medium (e.g., CD-R, MO or FD). To the external input terminal 132b are connected a cable for connection with a digital camera, a cable for connection with device type image data supply sources such as a personal computer, a scanner, a digital photoprinter and other types of printers including a direct printer, and a cable for connection with an image data supply source such as a communication network (e.g., Internet).

The image data acquiring section 132 includes a card reader for a memory card or the like inserted in the card slot 132a and an external input processing unit which controls the readout from a digital camera connected to the external input terminal 132b. The card reader is used to read out image data from a memory card or the like inserted in the card slot 132a, or the external input processing unit is used to control a digital camera connected to the external input terminal 152b to thereby read out image data from a memory card or the like inserted in the digital camera (see the image data readout in Step 100 of FIG. 10).

The preprocessing section 134 is the most characteristic portion of the present invention and is used to perform the red eye judgment (see the preprocessing for the red eye judgment in Step 102 of FIG. 10) in which image data of a frame read out by the image data acquiring section 132 is at least subjected to a judgment as to whether or not there is a possibility that a red eye phenomenon occurs.

On the other hand, the image processing section 136 subjects the image data of the frame read out by the image data acquiring section 132 to at least color/density correction, image structure processing (sharpening) and other usual image processing (see the image processing in Step 112 of FIG. 10). If the image processing section 136 has compatible image processing capability and image processing speed, photographing information (Exif information) recorded as an Exif tag based on Exif2.2 is preferably used to perform various image processing called ExifPrint image processing in which the image processing conditions are optimized for improving the print quality.

In addition to the processing as described above, the preprocessing section 134 and the image processing section 136 perform the red eye detection for detecting a red eye phenomenon on a frame image judged to have a possibility of red eye phenomenon as a result of the red eye judgment (see the red eye detection in Step 106 of FIG. 10) and the red eye correction for correcting a red eye phenomenon on a frame image in which the red eye phenomenon was detected as a result of the red eye detection (see the red eye correction in Step 110 of FIG. 10).

In other words, a configuration shown in FIG. 12A may be adopted in the present invention in which a preprocessing section 134a has a red eye judgment unit 144 for performing the red eye judgment as Preprocessing 1, whereas an image processing section 136a has a red eye detection unit 146 for red eye detection and a red eye correction unit 148 for red eye correction and performs the red eye detection, red eye correction and usual image processing, preferably ExifPrint image processing as Image Processing 1.

A configuration shown in FIG. 12B may also be adopted in which a preprocessing section 134b has the red eye judgment unit 144 and the red eye detection unit 146 and performs the red eye judgment and the red eye detection as Preprocessing 2, whereas an image processing section 136b has the red eye correction unit 148 and performs the red eye correction and usual image processing, preferably ExifPrint image processing as Image Processing 2.

A configuration as shown in FIG. 12C may further be adopted in which a preprocessing section 134c has the red eye judgment unit 144, red eye detection unit 146 and red eye correction unit 148 and performs the red eye judgment, red eye detection and red eye correction as Preprocessing 3, whereas an image processing section 136c performs only usual image processing, preferably ExifPrint image processing as Image Processing 3.

In the examples shown in FIGS. 11 and 12, image data whose red eye phenomenon has been corrected is subjected to usual image processing or ExifPrint image processing. However, this is not the sole case of the present invention and the usual image processing (ExifPrint image processing) may be performed at any timing before or after the red eye judgment, red eye detection or red eye correction.

The print output processing section 138 converts the image data obtained after the image processing in the image processing section 136 to image data adapted for outputting as a print (see the print output in Step 114 of FIG. 10). It is to be noted here that the image data sent to the print output processing section 138 after the image processing has been performed is image data of an image whose red eye phenomenon has been corrected, an image in which no red eye phenomenon was detected, or an image judged to have no possibility of red eye phenomenon.

The printer controlling section 140 uses the data obtained by the conversion in the print output processing section 138 to control the recording section 142 such that the section 142 can record a hard copy image and output a print on which a reproduced image is recorded (see print output in Step 114 of FIG. 10).

The recording section 142 includes a recording head such as an inkjet recording head or a laser recording head and a recording device. The printer controlling section 140 controls the recording section 142 so that the section 142 can record a reproduced image on paper such as ink-jet recording paper or laser recording paper.

The examples described above with reference to FIGS. 11 and 12 are directed to a direct printer which directly outputs image data from a digital camera or a memory card inserted therein as a print without reading out the image data on a personal computer. However, this is not the sole case of the present invention and these examples are applicable to any type of printer as far as the printer used is capable of image processing and print output, which has been as described above.

As described above in detail, according to the first embodiment of the third aspect of the present invention, it becomes possible to perform the red eye compensation with efficiency. When the full-automatic red eye compensation is performed in a digital photoprinter, for instance, it becomes possible to reduce the time for processing and to improve the productivity. Further, even if the processing time assigned to one frame is increased, it becomes possible to improve the accuracy of red eye compensation. As a result, the productivity as a whole cannot be impaired.

According to the second embodiment of the third aspect of the present invention, compensation for eye defects such as red eye and gold eye, aberrations such as distortion, lateral chromatic aberration, deterioration of marginal luminosity, and defocusing or other specified deterioration in image quality can be made with efficiency by performing, as preprocessing, the processing for judging whether there is a possibility that the specified deterioration in image quality occurs, with the aid of photographing information added to image data such as Exif information. The compensation can be made without any reduction of productivity even if a personal computer or a CPU having an enhanced image processing capability or speed is not particularly provided.

According to the third embodiment of the third aspect of the present invention, in addition to the effect achieved by the second embodiment described above, in the red eye compensation and other compensation for specified deterioration in image quality, unnecessary detection and correction of an image quality deteriorating portion in an image can be omitted, and a print can be thus outputted without impairing the productivity of a printer used.

Further, according to the fourth embodiment of the third aspect of the present invention, in addition to the effect achieved by the third embodiment described above, in the red eye compensation, aberration compensation and other compensation for specified deterioration in image quality, unnecessary detection and correction of an image quality deteriorating portion (e.g., red eye) in an image can be omitted by providing a printer with preprocessing means having a preprocessing function with which a judgment is performed as to whether there is a possibility of specified deterioration in image quality such as red eye phenomenon. Therefore, the detection and correction can be performed only for an image having a possibility of specified deterioration in image quality such as red eye phenomenon, so that a print can be outputted without impairing the productivity of the printer.

The printer having the preprocessing function according to the fourth embodiment of the third aspect of the present invention is capable of compensation for specified deterioration in image quality such as red eye phenomenon without particularly relying on a high-performance personal computer or a high-performance CPU having an enhanced image processing capability or speed. Therefore, the printer is useful as a direct printer capable of directly outputting image data from a digital camera or a recording medium thereof as a print without reading out the image data on a personal computer.

The red eye compensation method, image processing method, printing method and printer, in particular direct printer according to the third aspect of the present invention are basically constructed as described above.

The red eye compensation method and the image processing apparatus that implements this red eye compensation method according to the first aspect of the present invention, the image processing methods according to the second aspect, and the red eye compensation method, image processing method, printing method and printer according to the third aspect have been described above in detail. However, the present invention is not limited to the embodiments described above and it is of course possible to make various modifications and changes without departing from the gist of the present invention.

What is claimed is:

1. An image processing method for performing image processing on image data to generate output image data, comprising:

displaying on a display, a verification screen in which a predetermined number of frames of verification images corresponding to said image data are displayed and which doubles as means for designating a red eye frame for which red eye compensation should be performed, from among said predetermined number of frames of the displayed verification images, and, when a displayed verification image corresponds to said red eye frame, designating as the red eye frame said displayed verification image in said verification screen on said display;

displaying a predetermined number of frames of new verification images to be verified next and to be designate the red eye frame in the verification screen on said display, as well as sequentially subjecting image data of each frame of said predetermined number of frames of the verification images which has been subjected to verification formerly to image processing for obtaining the output image data, in response to an instruction for completing the verification of said predetermined number of frames of the verification images using the verification screen and, further performing the red eye compensation on the red eye frame; and suspending the displaying of said predetermined number of frames of the new verification images in the verification screen on said display as well as displaying on the display, a confirmation screen in which an image with which a result of the red eye compensation is confirmed is displayed, at the point in time when the red eye compensation of the red eye frame is finished, and performing the image processing on a subsequent frame in response to an instruction for completing confirmation of the red eye compensation, as well as resuming the suspended displaying of said predetermined number of frames of the new verification images in the verification screen on said display.

2. The image processing method according to claim 1, wherein pre-photometry for performing transmitted light quantity measurement or density measurement and photoelectrical image capturing based on a result of the transmitted light quantity measurement or the density measurement by the pre-photometry are performed once for each frame of a photographic film in order to obtain the output image data, and wherein the verification images are created using image data where images obtained by the image capturing are reduced, and the image processing for obtaining the output image data and the red eye compensation are performed using image data obtained by the image capturing.

3. The image processing method according to claim 1, wherein auxiliary information for use in judging whether or not red eye phenomenon occurs in each frame is displayed on the verification screen.

4. The image processing method according to claim 1, wherein, the red eye compensation includes detecting red eye phenomenon from a face which has been extracted in an image and correcting the red eye phenomenon, and wherein face extraction is performed with image data used to create the verification images and the red eye detection is performed with image data used to obtain the output image data.

5. The image processing method according to claim 1, wherein said confirmation screen for confirming the result of the red eye compensation is displayed so that it is overlaid on the verification screen at the point in time when the red eye compensation of the red eye frame is finished, and wherein the suspended displaying of said predetermined number of frames of the new verification images in the verification screen on said display is resumed from the displaying of said confirmation screen in response to the instruction for completing confirmation of the red eye compensation.

6. The image processing method according to claim 1, wherein photoelectrical image capturing is performed twice through prescan and fine scan on each frame of a photographic film to obtain the output image data, with the prescan being successively performed on each frame for one case and the fine scan being performed in units of a predetermined number of frames each time the instruction for completing the verification is issued, and wherein the verification images are created using image data obtained as a result of the prescan, and the image processing for obtaining the output image data and the red eye compensation are performed using image data obtained as a result of the fine scan.

7. The image processing method according to claim 1, wherein the predetermined number of frames comprises plural frames designated by an operator prior to subjecting the frames to red eye compensation.

8. The image processing method according to claim 7, wherein the plural frames for verification are displayed simultaneously.

9. An image processing method for performing image processing on image data to generate output image data, comprising:

displaying on a display, a verification screen in which a predetermined number of frames of verification images corresponding to said image data are displayed and which doubles as means for designating red eye frames for which red eye compensation should be performed, from among said predetermined number of frames of the displayed verification images, and, when a displayed verification image corresponds to said red eye frame, designating as the red eye frame said displayed verification image in said verification screen on said display;

displaying a predetermined number of frames of new verification images to be verified next and to be designate the red eye frame in the verification screen on said display, as well as sequentially subjecting image data of each frame of said predetermined number of frames of the verification images which has been subjected to verification formerly to image processing for obtaining the output image data, in response to an instruction for completing the verification of said predetermined number of frames of the verification images using the verification screen and, further performing the red eye compensation on the red eye frames; and displaying on the display, images with which results of the red eye compensation for the individual red eye frames are confirmed, after the red eye compensation of all the red eye frames has been finished.

10. The image processing method according to claim 9, wherein photoelectrical image capturing is performed twice through prescan and fine scan on each frame of a photographic film to obtain the output image data, with the prescan being successively performed on each frame for one case and the fine scan being performed in units of a predetermined number of frames each time the instruction for completing the verification is issued, and wherein the verification images are created using image data obtained as a result of the prescan, and the image processing for obtaining the output image data and the red eye compensation are performed using image data obtained as a result of the fine scan.

11. The image processing method according to claim 9, wherein pre-photometry for performing transmitted light quantity measurement or density measurement and photoelectrical image capturing based on a result of the transmitted light quantity measurement or the density measurement by the pre-photometry are performed once for each frame of a photographic film in order to obtain the output image data, and wherein the verification images are created using image data where images obtained by the image capturing are reduced, and the image processing for obtaining the output image data and the red eye compensation are performed using image data obtained by the image capturing.

12. The image processing method according to claim 9, wherein auxiliary information for use in judging whether or not red eye phenomenon occurs in each frame is displayed on the verification screen.

13. The image processing method according to claim 9, wherein, the red eye compensation includes detecting red eye phenomenon from a face which has been extracted in an image and correcting the red eye phenomenon, and wherein face extraction is performed with image data used to create the verification images and the red eye detection is performed with image data used to obtain the output image data.

14. An image processing method for performing image Processing on image data to generate output image data, comprising:

displaying on a display, a verification screen in which verification images corresponding to said image data are displayed and which doubles as means for designating a red eye frame for which red eye compensation should be performed, from among the displayed verification images;

sequentially subjecting image data of each frame which has been subjected to verification to image processing for obtaining the output image data, in response to an instruction for completing the verification of a predetermined number of frames using the verification screen and, further performing the red eye compensation on the red eye frame; and displaying on the display, an image with which a result of the red eye compensation is confirmed, at the point in time when the red eye compensation of the red eye frame is finished and performing the image processing on a subsequent frame in response to an instruction for completing confirmation of the red eye compensation, wherein photoelectrical image capturing is performed twice through prescan and fine scan on each frame of a photographic film to obtain the output image data, with the prescan being successively performed on each frame for one case and the fine scan being performed in units of a predetermined number of frames each time the instruction for completing the verification is issued, and wherein the verification images are created using image data obtained as a result of the prescan, and the image processing for obtaining the output image data and the red eye compensation are performed using image data obtained as a result of the fine scan.

15. An image processing method for performing image processing on image data to generate output image data, comprising:

displaying on a display, a verification screen in which verification images corresponding to said image data are displayed and which doubles as means for designating red eye frames for which red eye compensation should be performed, from among the displayed verification images;

sequentially subjecting image data of each frame which has been subjected to verification to image processing for obtaining the output image data, in response to an instruction for completing the verification of a predetermined number of frames using the verification screen and, further performing the red eye compensation on the red eye frames; and displaying on the display, images with which results of the red eye compensation for the individual red eye frames are confirmed, after the red eye compensation of all the red eye frames has been finished, wherein photoelectrical image capturing is performed twice through prescan and fine scan on each frame of a photographic film to obtain the output image data, with the prescan being successively performed on each frame for one case and the fine scan being performed in units of a predetermined number of frames each time the instruction for completing the verification is issued, and wherein the verification images are created using image data obtained as a result of the prescan, and the image processing for obtaining the output image data and the red eye compensation are performed using image data obtained as a result of the fine scan.

* * * * *